United States Patent
Krofchalk et al.

(10) Patent No.: US 10,166,837 B2
(45) Date of Patent: Jan. 1, 2019

(54) IDLE REDUCTION SYSTEM

(71) Applicant: IDLESAVER LLC, Rockwall, TX (US)

(72) Inventors: Gary F. Krofchalk, Rockwall, TX (US); Robert Renner, Rockwall, TX (US); Ann Renner, Rockwall, TX (US)

(73) Assignee: IDLESAVER LLC, Rockwall, TX (US)

( * ) Notice: Subject to any disclaimer, the term of this patent is extended or adjusted under 35 U.S.C. 154(b) by 0 days.

(21) Appl. No.: 15/503,275

(22) PCT Filed: Aug. 19, 2015

(86) PCT No.: PCT/US2015/045840
§ 371 (c)(1),
(2) Date: Feb. 10, 2017

(87) PCT Pub. No.: WO2016/028861
PCT Pub. Date: Feb. 25, 2016

(65) Prior Publication Data
US 2017/0305234 A1    Oct. 26, 2017

Related U.S. Application Data

(60) Provisional application No. 62/039,722, filed on Aug. 20, 2014, provisional application No. 62/154,527, filed on Apr. 29, 2015.

(51) Int. Cl.
*B60W 30/188* (2012.01)
*B60H 1/00* (2006.01)
(Continued)

(52) U.S. Cl.
CPC ......... *B60H 1/00778* (2013.01); *B60R 16/03* (2013.01); *F02D 29/02* (2013.01);
(Continued)

(58) Field of Classification Search
CPC .................................................. B60W 30/1886
See application file for complete search history.

(56) References Cited

U.S. PATENT DOCUMENTS 4,381,042 A * 4/1983 Perry ..................... B60K 28/04
                                            180/272
5,317,998 A * 6/1994 Hanson ............... F02N 11/0803
                                            123/179.4

(Continued)

FOREIGN PATENT DOCUMENTS

JP         2013170529 A     9/2013

OTHER PUBLICATIONS

International Search Report with Written Opinion dated Nov. 13, 2015 for PCT Patent Application No. PCT/US2015/045840, 16 pages.

(Continued)

*Primary Examiner* — Tisha D Lewis
(74) *Attorney, Agent, or Firm* — Smith IP Services, P.C.

(57) ABSTRACT

An idle reduction system for use with an engine can include a main unit including a controller, and a relay controlled by the controller. The relay can be electrically connected between an ignition switch and an electrical power source for starting the engine. A method of reducing idling of an engine can include connecting an idle reduction system, thereby permitting the system to shut down the engine in response to one or more predetermined conditions, the idle reduction system starting the engine in response to at least one of: a) battery voltage being less than a predetermined level, and b) engine temperature being less than a predetermined level, and the idle reduction system controlling operation of at least one of: an auxiliary air conditioner and an auxiliary heater.

18 Claims, 9 Drawing Sheets

(51) Int. Cl.
*F02D 29/02* (2006.01)
*F02N 11/08* (2006.01)
*B60R 16/03* (2006.01)

(52) U.S. Cl.
CPC ........ *F02N 11/084* (2013.01); *F02N 11/0803* (2013.01); *F02N 11/087* (2013.01); *F02N 2200/023* (2013.01); *F02N 2200/063* (2013.01); *F02N 2200/0802* (2013.01); *F02N 2200/0803* (2013.01); *F02N 2200/0804* (2013.01); *F02N 2200/0806* (2013.01); *F02N 2200/0814* (2013.01); *F02N 2200/122* (2013.01); *Y02T 10/48* (2013.01)

(56) References Cited

U.S. PATENT DOCUMENTS

| | | |
|---|---|---|
| RE36,437 E | 12/1999 | Hanson et al. |
| 6,768,221 B2 | 7/2004 | Klinger et al. |
| 7,003,395 B1 | 2/2006 | Thompson et al. |
| 8,565,932 B2 | 10/2013 | Oakes |
| 2002/0194856 A1* | 12/2002 | Yeo .................... B60H 1/00557 62/179 |
| 2003/0151307 A1 | 8/2003 | Klinger et al. |
| 2007/0233358 A1 | 10/2007 | Celisse et al. |
| 2009/0016042 A1 | 9/2009 | Oakes |
| 2013/0013176 A1 | 1/2013 | Bassindale |
| 2015/0177749 A1 | 6/2015 | Oakes |

OTHER PUBLICATIONS

Idle Smart; "Smarter Alternative to Idle Reduction", company article via http://idlesmart.com/, dated Apr. 17, 2014, 1 page.
Idle Smart; "Smarter Alternative to Idle Reduction", company user manual, 32 pages.
Smart Start; "SmartStart IIe" company brochure ZTR0007, dated Jun. 2012, 4 pages.

* cited by examiner

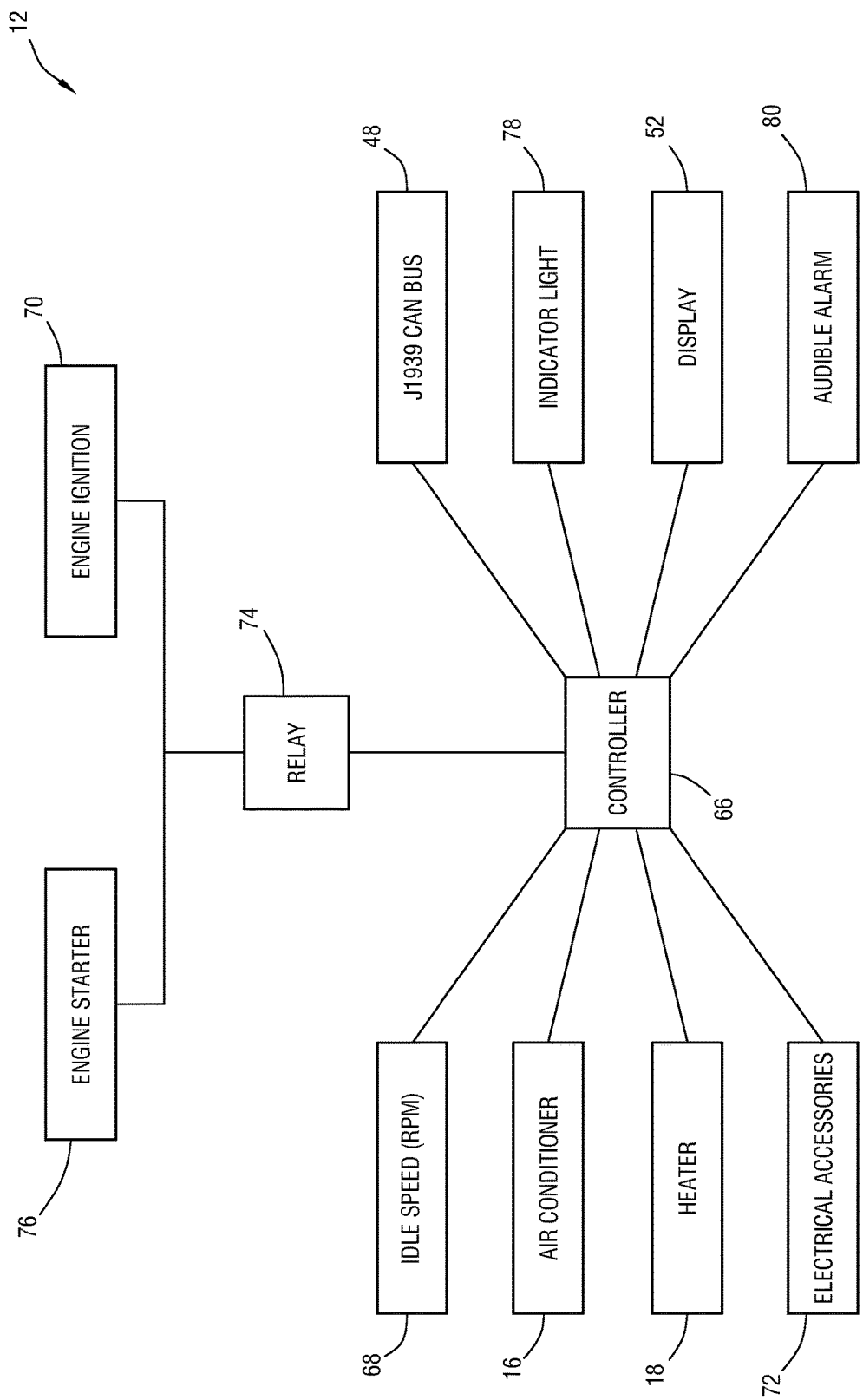

IDLE REDUCTION SYSTEM

CROSS-REFERENCE TO RELATED APPLICATION

This application is a national stage under 35 USC 371 of International Application No. PCT/US15/45840, filed on 19 Aug. 2015. The entire disclosure of this prior application is incorporated herein by this reference.

BACKGROUND

This disclosure relates generally to engine operational systems and, in various examples described below, more particularly provides a system that reduces engine idling time, provides for operator comfort and maintains the engine's ability to start.

Valuable fuel is consumed when an engine remains at idle for extended periods of time. Unfortunately, an operator does not always shut down an engine when it is not necessary for the engine to remain at idle. Therefore, it will be appreciated that improvements are continually needed in the art of reducing engine idling time, for example, to provide for operator comfort, to maintain battery charge and/or to maintain an elevated engine temperature.

BRIEF DESCRIPTION OF THE DRAWINGS

FIG. 3 is another representative block diagram of the idle reduction system, depicting examples of equipment controlled by a controller of the system.

DETAILED DESCRIPTION

Figure 1:
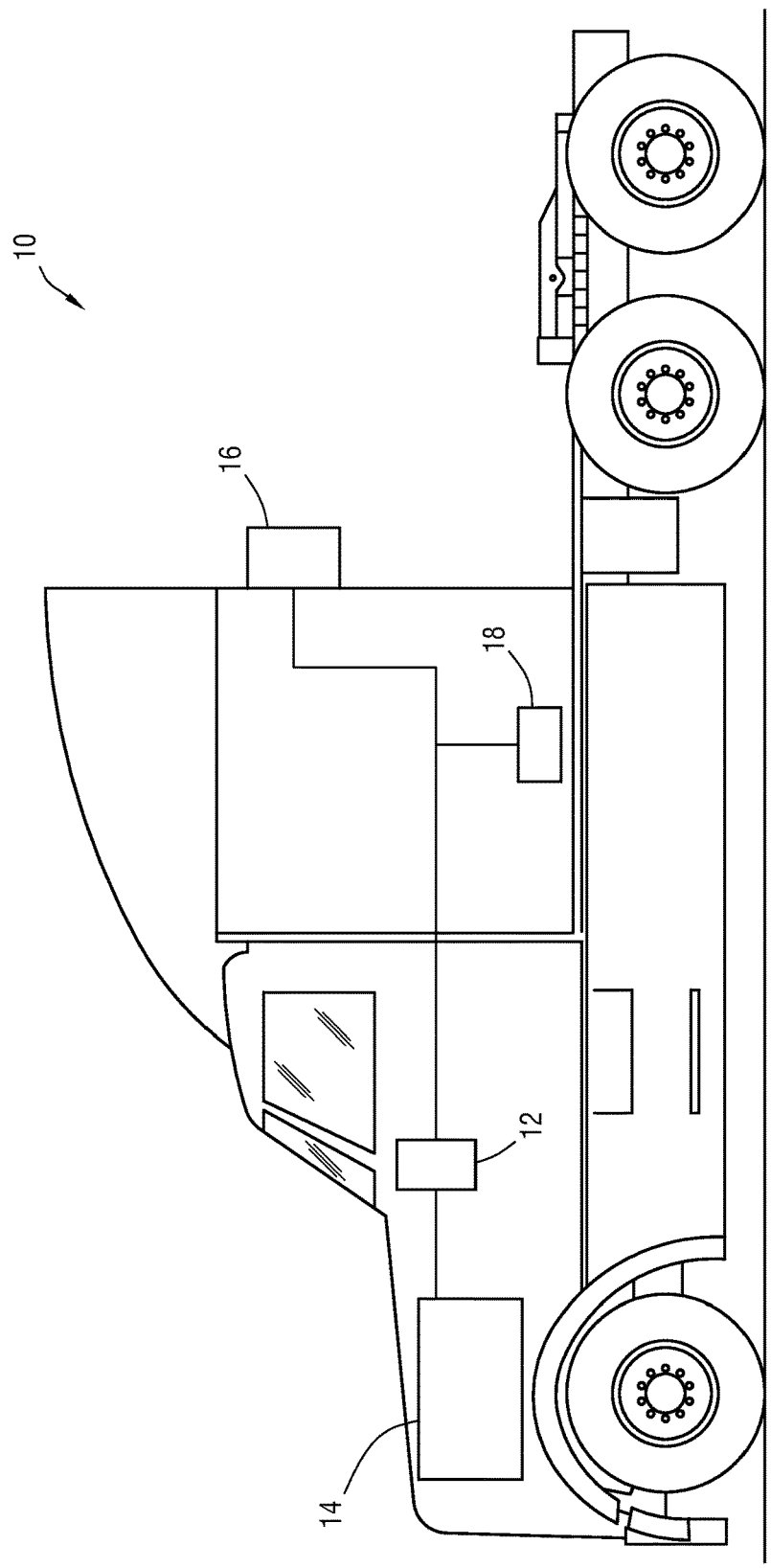
FIG. 1 is a representative side view of an example of a vehicle that can embody principles of this disclosure.

Representatively illustrated in FIG. 1 is a vehicle 10 which can embody principles of this disclosure. However, it should be clearly understood that the vehicle 10, as well as an idle reduction system 12 and method described below, are merely examples of an application of the principles of this disclosure in practice, and a wide variety of other examples are possible. Therefore, the scope of this disclosure is not limited at all to the details of the vehicle 10, idle reduction system 12 and method described herein and/or depicted in the drawings.

The vehicle 10 example of FIG. 1 is a truck (also known as a tractor) of the type used to transport cargo trailers on roads. However, in other examples, the vehicle 10 could be another type of vehicle, such as a bus, a locomotive, a car, construction equipment (for example, a dump truck), mining equipment (for example, an excavator), etc. Thus, the scope of this disclosure is not limited to use of the idle reduction system 12 with any particular type of vehicle.

Indeed, in some examples, the idle reduction system 12 could be used with a stationary engine (such as, an engine used to drive an irrigation pump). Accordingly, the scope of this disclosure is not limited to use of the idle reduction system 12 with a vehicle or any other apparatus in which an engine is mobile or portable.

Figure 2:
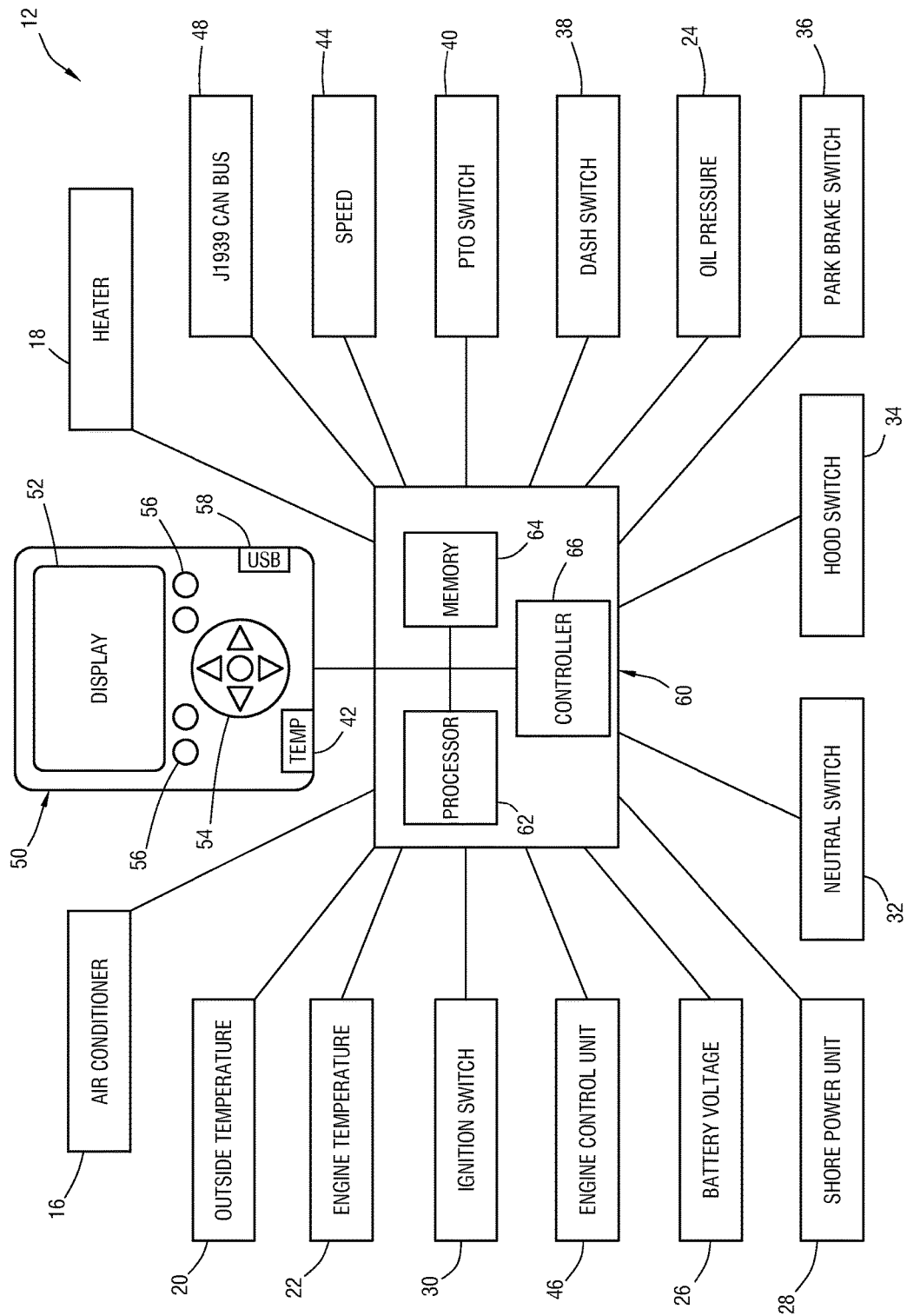
FIG. 2 is a representative block diagram of an idle reduction system that may be used in the vehicle of FIG. 1, and which can embody the principles of this disclosure.

The idle reduction system 12 of FIG. 2 is used to reduce idling of an engine 14 of the vehicle 10. The engine 14 could be, for example, a diesel or gasoline fueled engine, a liquefied petroleum gas (LPG) or compressed natural gas (CNG) engine, or a hybrid engine. The scope of this disclosure is not limited to use of the idle reduction system 12 with any particular type of engine.

In the FIG. 1 example, the idle reduction system 12 is also used with an auxiliary air conditioner 16 and an auxiliary heater 18. The auxiliary air conditioner 16 and the auxiliary heater 18 are used with the vehicle 10 in addition to the vehicle's typical air conditioner and heater supplied as components of a climate control system. However, note that the auxiliary air conditioner 16 and the auxiliary heater 18 are optional.

The auxiliary air conditioner 16 in this example is a 12 volt DC battery-powered air conditioner. In this manner, an interior of the vehicle 10 can be cooled without the engine 14 running. The auxiliary air conditioner 16 can be supplied with suitable batteries, so that the vehicle 10 batteries are not discharged when the air conditioner is operated. The auxiliary air conditioner 16 can also be supplied with an electrical power converter and battery charger, so that the air conditioner batteries can be recharged and the air conditioner can be operated by DC electrical power converted from AC electrical power, when available.

The auxiliary heater 18 in this example is a diesel fueled heater. The heater 18 uses the same fuel as the engine 14. In this manner, separate fuel does not have to be provided for the heater 18, and operation of the heater does not draw significant electrical power from the vehicle 10 batteries.

Referring additionally now to FIG. 2, a block diagram for an example of the idle reduction system 12 is representatively illustrated. This idle reduction system 12 may be used with the vehicle 10 of FIG. 1, or it may be used with other vehicles or in applications without a vehicle.

The idle reduction system 12 is depicted in FIG. 2 with a variety of different inputs. The inputs illustrated in FIG. 2 are merely examples, and more or less inputs, different inputs, or different combinations of inputs, may be used in particular applications. Thus, the scope of this disclosure is not limited to use of any particular inputs to the idle reduction system 12.

The auxiliary air conditioner 16 can be supplied with sensors (such as, temperature and pressure sensors) and a controller that stores and outputs sensor data, event logs, etc. Examples of these are described more fully below. The idle reduction system 12 can receive the air conditioner 16 controller and sensor outputs.

Similarly, the auxiliary heater 18 can be supplied with sensors (such as, a temperature sensor) and a controller that stores and outputs sensor data, event logs, etc. Examples of these are described more fully below. The idle reduction system 12 can receive the heater 18 controller and sensor outputs.

Additional temperature and pressure sensors that can provide input to the idle reduction system 12 include an outside ambient temperature sensor 20, an engine temperature sensor 22, an inside ambient temperature sensor 42 and an engine oil pressure sensor 24. Battery voltage 26 (typically 12-13 VDC) is supplied to the system 12.

If the auxiliary air conditioner 16 is used, a shore power unit 28 can be supplied with, or as a component of, the air conditioner to charge separate batteries that provide electrical power to the air conditioner. The shore power unit 28 can provide several inputs to the system 12, such as, voltage and current output, battery charge state, diagnostic codes, event logs, etc.

Various switches provide inputs to the system 12. These switches can include an ignition switch 30, a transmission neutral safety switch 32, a hood tilt switch 34, a park brake switch 36, a dash switch 38 and a power take-off (PTO) switch 40. If the system 12 is used with a vehicle, a speedometer 44 output can be input to the system 12.

Various ones of the above inputs could alternatively be supplied by an engine control module 46 (ECM, sometimes known as an engine control unit (ECU)). As is well known to those skilled in the art, the ECM 46 can control engine idle speed, fuel/air mixture, ignition timing and other engine operational parameters. The engine control module 46 can, in some examples, receive inputs from the outside temperature sensor 20, the engine temperature sensor 22, the ignition switch 30, the neutral switch 32, the oil pressure sensor 24, the PTO switch 40 and the speedometer 44, and can output this information to the system 12.

In some vehicles, an industry standard Society of Automotive Engineers (SAE) J1939 controller area network (CAN) bus 48 is used for communication of information in the vehicles. In such vehicles, the J1939 CAN bus 48 can be a source of most (if not all) of the inputs to the system 12. By use of the J1939 CAN bus 48, separately or in combination with the engine control module 46, a need to connect the system 12 separately to each of the sensors 20, 22, 24, switches 30, 32, 34, 36, speedometer 44, etc., can be reduced or eliminated.

The system 12 of FIG. 2 includes an input/output (I/O) device 50. In this example, the I/O device 50 includes a display 52, cursor control 54, entry keys 56 and a data port 58 (such as, a universal serial bus (USB) port, storage drive connector, memory card slot, etc.). In other examples, other input or output devices could be provided, such as, a touchscreen, a keyboard, a mouse, a printer, a scanner, wireless communications, etc.

The I/O device 50 allows an operator or technician to enter operational parameters, select from pre-programmed options, monitor system functions and data, and otherwise interact with the system 12. The I/O device 50 may have a capability to connect to any of the industry standard PEOPLENET™, OMNITRACS™ and TELETRAC™ two-way wireless communication networks, whereby data and control signals can be transmitted between the system 12 and a remote location.

The various inputs and the I/O device 50 are connected to a main computing and control unit 60 of the system 12. In this example, the main unit 60 includes at least a processor 62, memory 64 and a controller 66. Of course, other or different components may be provided in other examples.

The processor 62 may be a microprocessor or other type of computing device. The memory 64 may be volatile and/or non-volatile memory (such as, read only memory (ROM), electrical programmable read only memory (EPROM), random access memory (RAM), a hard drive (HD), a solid state drive (SSD), etc.), and may be combined or integrated with the processor 62. The memory 64 may be pre-programmed with instructions for operating the processor 62 and/or controller 66. Any programmed instructions can be updated or replaced by means of the data port 58 of the I/O device 50.

The controller 66 may be any type of controller capable of controlling operation of various components of the system 12 and vehicle 10 as described more fully below. For example, the controller 66 could include a programmable logic controller (PLC) with or without an associated proportional-integral-differential (PID) controller. Any suitable controller may be used in keeping with the principles of this disclosure.

Referring additionally now to FIG. 3, examples of various components of the system 12 that can be controlled by the controller 66 are representatively illustrated. Of course, other or different components or combinations of components may be controlled by the controller 66 in keeping with the principles of this disclosure.

In some examples, operation of the auxiliary battery-powered air conditioner 16 may be controlled by the controller 66. In other examples, the air conditioner 16 may not be used, or it may be operated independently of the controller 66. Similarly, the auxiliary heater 18 may not be used, or it may be operated independently of the controller 66.

In the FIG. 3 example, the controller 66 can be used to control engine revolutions per second (RPM) or idle speed 68. This control over idle speed 68 can be exercised by interface with the ECM 46 (for example, by regulating a cruise control function of the ECM). The controller 66 may interface directly with the ECM 46, via the J1939 CAN bus 48, or another technique for controlling idle speed may be used.

In general, two idle speeds are used by the system 12—a relatively slow idle speed and a relatively fast idle speed. The slow idle speed will typically exist when the system 12 is activated. In addition, the system 12 will typically return the engine 14 to its slow idle speed prior to shutting down the engine (a "gentle" engine shutdown), in order to avoid large vibrations and possible engine harm caused by shutting down from the fast idle speed. The fast idle speed is used for charging the batteries 26, warming up the engine 14 and/or operating a vehicle's climate control system (air conditioning or heater).

The controller 66 can control supply of electrical power to the engine ignition 70 and electrical accessories 72. In addition, the controller 66 can operate a relay 74 to supply electrical power to an engine starter 76. For example, the controller 66 can start the engine 14 by turning on the engine ignition 70 and activating the relay 74 to thereby cause the starter 76 to start the engine.

An indicator light 78 can be used to provide a visual indication of a state or mode of the system 12 to an operator or technician. For example, the indicator light 78 can indicate when the system 12 is active or inactive, or whether a violation of a safety condition exists.

An audible alarm 80 (such as, a buzzer or speaker) can alert the operator or technician to problems (for example, a violation of a safety condition), or to possible danger (for example, eminent starting of the engine 14). In one example, the controller 66 can activate the alarm 80 if the hood switch 34 indicates that a hood of the vehicle 10 is open, and the engine 14 will soon be started by the system 12.

In basic terms, operation of the system 12 is controlled by use of the I/O device 50 and the dash switch 38. The term "dash switch" is used in this example, because it would typically be installed in an instrument dash of the vehicle 10. However, if the system 12 is not used with a vehicle, the switch 38 could be otherwise positioned.

In this example, the dash switch 38 is a three position control switch. The three positions are On, Stop Only (Off), and Momentary On.

Use of this three position switch 38 with the momentary on position enables the operator to take graceful control of the engine 14 when the system 12 is active and operating the engine. When the operator moves the switch 38 to the momentary on position, the system 12 (controller 66) will cause the engine 14 to drop from fast idle RPM to slow idle RPM by removing fast idle voltage from the cruise control or the engine ECM 46 or by sending an appropriate signal via the J1939 CAN bus 48.

The controller 66 then flashes the indicator light 78 green for a 30 second time period (configurable) during which the operator can take control of the engine 14 without having to first stop the engine. All the operator does to take control of the engine 14 operation during this 30 second time period is to put the vehicle's transmission in gear or release the vehicle's park brake. The engine 14 will continue to run and the system 12 will go inactive. If the operator does not take control during the 30 second time period, the system 12 will again be active and take control of engine operation.

If the operator just wants to stop the system 12 from running the engine 14, the operator can avoid a harsh shutdown from fast idle by toggling the switch 38 to its momentary on position and waiting until the system 12 drops the engine RPM from fast idle to slow idle. When this happens, the controller 66 will cause the indicator light 78 to flash green for a configured time period (such as, 30 seconds) during which time the operator can move the dash switch 38 to the Stop Only position to shut down the engine 14. Engine shutdown from slow idle RPM is a normal engine shutdown and avoids shaking and noise caused by an immediate shutdown from fast idle. If the engine 14 is not shut down during the configured time period, the system 12 will again be active and take control of engine operation.

The I/O device 50 is not necessarily used, but when it is used with the system 12, it can provide a variety of features. In some examples, the I/O device 50 can be used by a technician to set up the system 12 for a particular application, after which the system 12 can operate without the I/O device, except that the I/O device could still be used from time to time, for example, to change settings, to update software, to download data, etc.

The I/O device 50 can display status and selections. It can include buttons or keys 54, 56 to move a cursor on the display 52 and to enter and save or change data. Backlighting for the buttons or keys 54, 56 can be manipulated by the controller 66 to provide different colors that can also be either solid or flashing. The system 12 can use the backlighting, different colors and flashing to provide a visual indication of the status or mode in which the system is operating.

The I/O device 50 provides operator access to menu displays (for example, menus which do not need password authority), the means to navigate through these menus and to enter or modify data in fields that accept data entry or that have multiple choices. Password protected menus may be provided for access by technicians or employers to configure certain operating parameters.

The I/O device 50 can be directly connected to the main unit 60 via a serial interface. In some examples, the display 52 could be separate from the various input devices (e.g., cursor control 54, keys 56, data port 58), or the I/O device 50 could be integrated with the main unit 60. Thus, the scope of this disclosure is not limited to any particular configuration of combination of components in the system 12.

If the system 12 is active, it will default to engine mode, in which the system controls starting and shut down of the engine 14, in order to keep the batteries 26 charged and to keep the engine warm. The I/O device 50 can also be used by the operator to select heat, cool or auto mode and to set a desired temperature target (Set Temp) and range for inside temperature.

Different ranges can be set for the vehicle's climate control system and for the auxiliary air conditioner 16 and heater 18. For example, the range for the vehicle's climate control system could be +/−3 or 4 degrees, and the range for the auxiliary air conditioner 16 and heater 18 could be +/−1 degree.

If both the auxiliary air conditioner 16 and the auxiliary heater 18 are installed, the operator can select the auto mode. In this mode, the system 12 is capable of, by referencing outside temperature (e.g., via the outside temperature sensor 20), operate the appropriate auxiliary unit. An example would be a driver and truck in a desert area where it can be quite hot in early evening hours but cold in the early morning. In this example, the system 12 would run the auxiliary air conditioner 16 in the evening and the auxiliary heater 18 in the early morning.

In some situations (such as, because of harsh weather conditions or auxiliary unit failure), an auxiliary unit may be installed but not capable of maintaining interior temperature within the +/−1° range of the set temperature. In those situations, when the interior temperature rises or lowers to the set temperature +/− the range, the system 12 will automatically start the engine 14 and will then operate the vehicle's climate control system (heating, ventilation and air conditioning (HVAC)) to supplement the auxiliary unit. In heat or cool mode, whether auxiliary units (air conditioning 16 and/or heater 18) are installed or not, the system 12 will still start and stop the engine 14 as needed to charge the batteries 26 and to maintain engine warmth.

The I/O device 50 can be used to display diagnostic information. This feature is useful for troubleshooting and verifying proper installation.

In one example, a nine digit error status field can be displayed. The error status field can be for a current, real time error or for a recorded past error event. If any of the digits in the error status field is a "1", by pressing a key 56 on the I/O device 50, the display 52 will show appropriate identifying text for the corresponding error. The ability to access error status fields for past error events is very valuable in cases where there are intermittent failures.

The I/O device 50 can be used to perform diagnostic tests. For example, the I/O device 50 can be used to test the system's 12 ability to start the engine 14. The system 12 must be active (e.g., with the indicator light 78 illuminated green) to test the system's ability to start the engine.

In order to perform this test, the operator starts the engine 14 normally with all of various safety conditions satisfied. When the engine 14 is running, and the dash switch 38 in the on position, the indicator light 78 should turn green. After it does, the system 12 will shut off the engine 14 after a predetermined time period. Then, by selecting and activating a menu item on the I/O device 50, the system 12 should start the engine 14 for a successful test. If the system 12 does not start the engine 14, there is a problem that will have to be fixed.

The I/O device 50 can be used to test the system's 12 ability to cause the engine 14 to go to fast idle. This test is performed with the safety conditions satisfied and the dash switch 38 in the stop only position. With the engine 14 running, a menu item on the I/O device 50 is selected and activated. The engine 14 speed should then increase to fast idle.

The main unit 60 memory 64 can accumulate data for later download or communication to a remote location (such as, via the PEOPLENET™, OMNITRACS™ and TELE-TRAC™ networks), for evaluation of operator, vehicle 10, engine 14 or system 12 performance. Such data can be accumulated for each individual trip and for a total time of operation.

For an individual trip, the data accumulated can include a total number of hours the system 12 detected the vehicle speedometer 44 signal (indicating movement of the vehicle 10, also known as road hours), the total number of hours the system did not detect the engine 14 running (also known as stop hours), the total number of hours the system detected the engine running with the park brake switch closed, the total number of hours the system detected the engine running with the park brake switch open and no speedometer signal, the total number of hours the system has been in control of the engine with the engine running, the total number of hours the system has been in control of the engine without the engine running (i.e., shut down), the total number of hours the system has run the engine because of low battery voltage, the total number of hours the system has run the engine because of low engine temperature, the total number of hours the system has run the engine to operate the vehicle's heater, the total number of hours the system has run the engine to operate the vehicle's air conditioner, the total number of hours the system has been active with the engine turned off (this is called standby), the total number of hours the system has been in standby (the system active with the engine turned off) and the auxiliary heater has been turned on, the total number of hours the system has been in standby and the auxiliary air conditioner has been turned on by the system, the total number of engine starts by the system, the total number of engine starts by the system for low battery condition, the total number of engine starts by the system for low engine temperature, the total number of engine starts by the system for low interior temperature, the total number of engine starts by the system for high interior temperature, the calculated average number of minutes the system ran the engine regardless of the reason the system started the engine, the calculated average number of minutes the system ran the engine after starting the engine because low battery voltage, the calculated average number of minutes the system ran the engine after starting the engine because of low interior temperature, and the calculated average number of minutes the system ran the engine after starting the engine because of high interior temperature.

Similar data can be accumulated for the total time of operation (e.g., including many trips). In some examples, trip data records can be cleared by the operator, whereas total records can only be cleared by someone with password access.

Because total data records may be rarely, if ever, cleared they are most useful if the data records are extracted from the main unit 60 at regular intervals and are imported into a software program, such as a database, for evaluation. If this is done, both operator performance and system 12 performance can be conveniently evaluated between any two extraction dates. For example, by subtracting an earlier total data record from a more current total data record, the differences in the data will be apparent for the period of time between the records. With this capability, managers will have data with which they can evaluate, for instance, an operator's utilization of the system 12, and the performance of the system when utilized.

Event log records can be stored in the memory 64. A variety of different event identifications (ID's) can be included in the event log records to identify corresponding conditions monitored by the system 12. Additional or modified event ID's and monitoring routines can be added at any time for new features and capabilities of the system 12 (for example, via the data port 58).

Upon the occurrence of any predetermined event, the main unit 60 immediately creates and saves an event log record for the event, together with pertinent parameters (such as, sensor readings), configurations, states and data. In this example, the information contained in these records can be extracted from the main unit 60 as a data text file for use in a spreadsheet, relational database or other software program. From this extracted data, useful reports, etc., can be produced to evaluate and review the data.

The event log records can be very valuable aids for troubleshooting in case the system 12 has experienced a failure. Certain event log records can be flagged as records of special interest in their event ID's. One of the special interest types is for event ID's that are designated as an error. By examining these event log records, a user can quickly investigate errors when troubleshooting the system 12.

Event log records can be produced, for example, when the system 12 becomes active, the system performs an engine 14 shutdown, the system performs an engine start, a sensor error occurs, a sensor recovers, etc. Each of these events may be viewed in the order in which they occurred in the event log records.

If extended engine 14 idling occurs while the system 12 is active, and it should not occur, this condition can be identified as an error in an event log record. A number of minutes of idling which can pass before an error event log record is created can be set. Such an event log record can be flagged as an "Admin" special interest record to notify management or maintenance personnel that this condition has occurred.

An event log record can include the following information: whether the event is of special interest (an "Admin" event, for example), the date and time the event log record was created, the event ID (for example, a two digit code identifying what event occurred to cause the creation of the event log record), any errors that existed when the event log record was created, the dash switch 38 position, whether the hood tilt switch 34 was closed or open, whether the neutral safety switch 32 was closed or open, whether the park brake switch 36 was closed or open, whether an optional customer switch was disabled, closed or open, whether an optional engine regeneration switch was disabled, closed or open, whether the optional PTO switch 40 was closed or open, whether an optional low air switch was closed or open, the engine 14 speed (RPM), the vehicle speed, the battery 26 voltage, the engine temperature (via the sensor 22), the interior temperature (via the sensor 42), the outside temperature (via the sensor 20), the position of the ignition switch 30, whether the relay 74 is on or off, whether the engine ECM 46 power is on with the system active, whether the system was starting the engine when the record was saved, whether the system activated fast idle when the record was saved, whether the auxiliary heater was on or off, and whether the auxiliary air conditioner was on or off.

The I/O device 50 can be used to configure certain features of the system 12. Some features can only be configured, or set configurations can only be changed, with password access.

Features that can be configured via the I/O device 50 may include changes to desired interior temperature settings and ranges, system inputs such as vehicle speedometer 44 source, engine temperatures and battery voltages for initiating engine starts, configuration changes to various engine shutdown routines, engine fast idle RPM, date and time.

An outside temperature can be set, above which the system 12 will permit the engine 14 to run continuously, in order to provide for operation of the vehicle's air conditioning if necessary. An outside temperature can be set, below which the system will continuously run the engine to provide heat if necessary. A lowest and a highest interior temperature can be set, which the main unit 60 will permit the operator to select as a desired interior temperature setting.

Normally, the system 12 will cause the alarm 80 to sound for a configured number of seconds before the engine 14 is started. However the system 12 can be configured to not sound the alarm 80 when the system starts the engine 14 to provide heating or cooling of the interior.

If the engine 14 is used for PTO services and extended idling for PTO operation is needed, a +12V signal will be supplied (via the PTO switch 40) to the main unit 60 PTO connector and the I/O device 50 can then be used to configure the PTO service to "on." To use the PTO feature, the dash switch 38 is moved to the stop only position. When this is done, the system 12 will permit extended idling by not performing a standard mandatory shutdown after a predetermined period of idling, but will instead permit the engine 14 to run as long as the +12V PTO signal is present at the main unit 60 PTO connector. The system 12 will create and save an event log record when the PTO signals start and stop.

Some users will have need for short term extended run times past the mandatory shutdown time period. An example is for heavy haul applications that use many tag axles for both a truck and a trailer. For this type of use, particularly in cold weather, there may be times when the system 12 would shut down the engine 14 before the vehicle's 10 air compressor can build up enough air pressure to release the park brakes on all of the axles.

The low air feature solves the need for occasional periods of extended run time such as this, and for any other reasons a user may have. To use this option, a momentary switch is installed in or on the vehicle or other equipment, and this switch is connected to the main unit 60. Toggling the switch provides a signal to the main unit 60 when the extended low air time is needed. An extended run time can be set by someone with password access. The system 12 will create and save an event log record when the low air switch signals start and stop.

The battery 26 voltage level which will cause the system 12 to start the engine 14 to charge the batteries can be set (for example, between 11 and 13 volts. The battery 26 voltage level which will cause the system 12 to shut down the engine 14 after charging the batteries can also be set (for example, between 13 and 14 volts). A minimum number of minutes the system 12 will run the engine 14 after a start for low battery voltage can also be set (for example, between 10 and 45 minutes).

The engine 14 temperature at which the system 12 will start the engine to warm the engine, and the engine temperature at which system will shut down the engine after a cold engine start, can be set. A number of minutes can be set after which, if the engine 14 is still running after an engine start for cold temperature, the system 12 will check the engine temperature and, if the temperature is at or above 38° C. (−100° F.), the system will shut down the engine if all other qualifiers are met.

One desirable feature of the system 12 is its ability to limit unintentional or intentional engine 14 idling by shutting down the engine when the dash switch is in the stop only position. This is referred to herein as "mandatory shutdown," since an operator without password access cannot disable this feature. However, a person with password access can disable the mandatory shutdown feature.

A person with password access can also select a condition (in addition to safety conditions) which activates the mandatory shutdown feature and begins a time period, after which the system 12 will shut down the running engine 14. One condition that may be selected for activation of mandatory shutdown is if no speedometer signal is detected by the main unit 60. An alternate condition is that the transmission is in neutral (via the neutral safety switch 32) and there is no speedometer signal 44. Another alternate condition is that the transmission has to be in neutral and the park brake has to be set (via the park brake switch 36). Yet another alternate condition is that the transmission has to be in neutral before the mandatory shutdown timer will start. The number of minutes the chosen mandatory shutdown condition has to exist before the system 12 will shut down the engine 14 can be set.

An amount of time the system 12 will let the engine 14 run after all requirements have been met (engine 14 temperature, battery 26 voltage, and interior temperature if the system is in heat or cool mode) can be set. An amount of time after the engine 14 is started before the system 12 activates fast idle can be set.

A level to which battery 26 voltage can drop before the system 12 will turn off the electrical accessories 72 can be set. This level should typically be no less than the voltage that triggers the system 12 to start the engine 14 for low battery voltage.

A maximum engine RPM permitted by the system 12 when it is active in control of the engine can be set. If the engine RPM exceeds this maximum, the system 12 will shut down the engine 14.

A type of cruise control that is operating in the vehicle 10 (for control of engine fast idle speed) can be selected. The choices can be, for example, PTO, ramp, pulse and J1939. If the system 12 fast idle input is connected to the vehicle's PTO pin in the engine ECM 46, the selection should be PTO. If the vehicle's cruise control "resume" switch can be used to increment up or down the fast idle RPM, then the selection should be ramp. If a +12V pulse to the cruise control's "on-set" switch causes the vehicles idle speed to automatically goes to a fast idle RPM programmed in the engine's ECM 46, the selection should be pulse. If the main unit has been appropriately programmed to activate a J1939 CAN bus 48 engine PTO port for fast idle, then J1939 should be selected.

If ramp is selected for engine fast idle control, the fast idle RPM can be set via the I/O device 50 for engine mode RPM. If any other selection is made for engine fast idle control, the system 12 does not use engine mode RPM.

If ramp is selected for engine fast idle control, the fast idle RPM the system 12 will use for heat and cool mode operation can be set via the I/O device 50. If any other selection is made for engine fast idle control, the system 12 does not use heat or cool mode RPM.

The functionality of the system 12 engine fast idle control can be tested. In order to do this, the dash switch 38 is placed in the stop only position. The engine 14 is running at an RPM that is less than the configured fast idle RPM, preferably at base idle RPM. If those conditions exist, the ability of the system 12 to raise the engine RPM to fast idle RPM can be tested via the I/O device 50.

The J1939 CAN bus 48 provides for enhanced functionality and simplified installation of the system 12. Each data source that can be obtained from the J1939 CAN bus 48 eliminates installation time and cost for one sensor or connection point, one wire harness and a connection to the main unit 60. Data sources from the J1939 CAN bus 48 should be more reliable than independent, external sources because the engine 14 and the vehicle 10 rely on or provide these data sources, and they are not typically subject to the environment and human mistakes that can be made while installing supplemental wire harnesses and sensors. The main unit 60 can be connected to a diagnostic connector of the vehicle 10 in some examples.

J1939 data packets and the information they contain may differ between various engine and vehicle manufacturers, and may also change due to model changes and passage of time. The system 12 is designed to be able to use any J1939 data source that may be identified and made available by a manufacturer. The main unit 60 software can be updated at any time to enable the main unit to scan and use the information in new or different J1939 data packets.

The relay 74 enables the system 12 to interrupt transmission of electrical power from the battery 26 to the ignition switch 30. When interrupted (the relay 74 is normally open) the engine 14 will shut down. This can be used to prevent inadvertent and intentional engine 14 idling.

The relay 74 is electrically connected between the battery 26 and an input power supply post on the ignition switch 30. The relay 74 is preferably physically located in the main unit 60, instead of being readily accessible to the operator, so that the operator cannot conveniently override the function of the relay.

An electrical accessories post of the ignition switch 30 is separately connected to the main unit 60. This enables the main unit 60 to sense when the ignition switch 30 is turned to the accessories position. As mentioned above, the controller 66 can disconnect electrical power from the accessories 72 if battery 26 voltage drops to a selected level.

The controller 66 is also connected to the engine starter 76. This allows the controller 66 to start the engine 14 when needed to charge the battery 26, warm the engine, or heat or cool the vehicle 10 interior.

If the ignition switch 30 is in the on position, the main unit 60 will start and stop the engine 14 as needed for HVAC operation. Even when the engine 14 is not running, the vehicle's blowers will operate if a fan switch is left in an on position. The main unit 60 does this by back-feeding electrical power to the ignition switch 30 ignition on and accessories posts.

When the ignition switch 30 is in the off position, the main unit 60 will default to engine mode only. The main unit 60 can also operate in auto, heat or cool mode with the ignition switch in the off position, if one of these is selected by the operator.

The main unit 60 can operate in engine mode and/or auto, heat or cool mode when the ignition switch 30 is in the accessories position. This provides the benefit of enabling the accessories 72 to remain on when the main unit 60 is not running the engine 14. This is a benefit for an operator that uses, for example, the vehicle's radio, a refrigerator, a microwave, a TV, a computer, etc., that operates with accessory power.

The park brake switch 36 is part of a safety circuit of the system 12. If the park brake switch 36 indicates that the park brake of the vehicle 10 is not set, the system 12 will not start the engine 14. Of course, if the system 12 is not used with a vehicle, then the park brake switch 36 is also not used.

When the vehicle's park brake is set, the park brake switch 36 closes and thereby indicates to the main unit 60 that the vehicle's park brake is set. The system 12 will not go active and run the engine 14 unless it detects that the park brake switch 36 is closed and remains closed.

If the system 12 is active and is in the engine start mode, engine run mode or engine fast idle RPM drop to base idle mode, and the park brake switch 36 opens (indicating that the vehicle's park brake is no longer set), the system will immediately shut down the engine 14 and go inactive. The main unit 60 software causes the indicator light 78 to turn red when this happens. If the system 12 is in standby mode when the park brake switch 36 opens, the system will immediately go inactive and the main unit 60 will cause the indicator light 78 to turn red.

In this example, the park brake switch 36 can comprise a normally open air pressure switch pneumatically connected (for example, with a T-fitting) to the vehicle's air line for operating the vehicle's park brake. Preferably, the park brake switch 36 is not in series with other safety circuit elements (such as, the hood tilt switch 34 and the neutral safety switch 32), but is on a separate circuit. If the park brake switch 36 or its associated circuit fails either in the open or closed condition this separate circuit enables the main unit 60 to identify the problem as a park brake switch circuit problem, instead of just a safety circuit problem. If this happens, the main unit 60 immediately creates an event log record for the event. This capability reduces troubleshooting time and effort. However, in some examples the park brake switch 36 could be in series with other safety circuit elements, if desired.

The transmission neutral switch 32 (neutral safety switch) is a part of the safety circuit of the system 12. Its function is to verify that the vehicle's transmission is in neutral before the system 12 will be able to go active and run the engine 14.

If the system 12 is active and is in the engine start mode or engine run mode, and the neutral safety switch 32 opens, the system will immediately shut down the engine 14 and go inactive. The main unit 60 software causes the indicator light 78 to turn red when this happens. If the system 12 is in standby mode when the neutral switch 32 opens, the system will immediately go inactive and the main unit 60 will cause the indicator light 78 to turn red.

Preferably, the neutral switch 32 is not in series with other safety circuit elements (such as, the hood tilt switch 34 and the park brake switch 36), but is on a separate circuit. If the neutral switch 32 or its associated circuit fails either in the open or closed condition this separate circuit enables the main unit 60 to identify the problem as a neutral switch circuit problem, instead of just a safety circuit problem. If this happens, the main unit 60 immediately creates an event log record for the event. This capability reduces troubleshooting time and effort. However, in some examples the neutral switch 32 could be in series with other safety circuit elements, if desired.

The hood switch 34 (hood "tilt" switch, if the vehicle's hood is tilted when open) is a part of the safety circuit of the system 12. Its function is to verify that the vehicle's hood is closed before the system 12 will go active and run the engine 14. If the system 12 is active and is in the engine start mode or engine run mode, and the hood switch 34 opens, the system 12 will immediately shut down the engine 14 and go inactive. The main unit 60 software causes the indicator light 78 to turn red when this happens. If the system 12 is in standby mode when the hood switch 34 opens, the system will immediately go inactive and the main unit 60 will cause the indicator light 78 to turn red.

Preferably, the hood switch 34 is not in series with other safety circuit elements (such as, the neutral switch 32 and the park brake switch 36), but is on a separate circuit. If the hood switch 34 or its associated circuit fails either in the open or closed condition this separate circuit enables the main unit 60 to identify the problem as a neutral switch circuit problem, instead of just a safety circuit problem. If this happens, the main unit 60 immediately creates an event log record for the event. This capability reduces troubleshooting time and effort. However, in some examples the hood switch 34 could be in series with other safety circuit elements, if desired.

The outside ambient temperature sensor 20 provides data for an outside temperature display on the I/O device 50, and is used by the main unit 60 in determining whether the engine 14 should be allowed to continue to run for an extended period of time to heat or cool the vehicle's interior. In some examples, the outside ambient temperature sensor 20 may be physically located in an outside unit of the auxiliary air conditioner 16. In other examples, the vehicle 10 may be manufactured with an outside temperature sensor, in which case the outside temperature data may be available to the main unit 60 via the J1939 CAN bus 48.

The PTO feature of the system 12 will only function when the dash switch 38 is in the stop only position. The PTO switch 40 provides a signal to the main unit 60, in order to allow suspension of the mandatory shutdown feature. In some examples, the vehicle 10 is manufactured with a switch for operating the vehicle's PTO, and data indicating PTO operation is available via the J1939 CAN bus 48, and so use of a separate PTO switch is not necessary.

The battery powered auxiliary air conditioner 16 can include pressure sensors connected to its high and low pressure refrigerant lines, and temperature sensors at an output side of its evaporator and condenser, in order to monitor performance of the air conditioner. In addition, as mentioned above, the outside ambient temperature sensor 20 can be included in an outside unit of the air conditioner 16. An air conditioner controller 82 (see FIG. 6) monitors these sensors, manages operation of the air conditioner 16 for efficiency, and also creates event log records and transfers such records to the main unit 60.

Similarly, the auxiliary heater 18 can include a controller (not shown) that monitors operation of the heater and transmits event log records to the main unit 60. In some conventional diesel powered air heaters, in the event of an operating failure, an indicator light on the air heater's manual control will flash several times quickly and a number of slower flashes will follow. The number of slow flashes identifies the nature of the failure. The air heater controller can monitor for the slow flash failure code and, if such a flashing code occurs, the heater controller can create an event log record and transmit it to the main unit 60.

The shore power unit 28 can also be located in an outside unit of the auxiliary air conditioner 16. In this example, the shore power unit 28 comprises a converter/battery charger that converts 115 V, 20 Amp AC current into 13.6V 70 Amp DC current. A microprocessor controller of the shore power unit 28 monitors its operation, and all significant changes in operation cause the controller to create an event log record and transmit it to the main unit 60.

The relay 74 is connected between the batteries 26 and the ignition switch 30 power post, so that the system 12 can shut down the engine 14 (for example, to perform a mandatory shutdown). Even when the dash switch 38 is in the stop only position, the system 12 will open the relay 74 when it detects engine 14 idling that continues after a configured time limit is reached. This mandatory shutdown feature is desirable, because it prevents intentional and unintentional idling, and electrical power to the accessories 72 can be disconnected, so the batteries 26 will not discharge while the engine 14 is not running. The mandatory shutdown feature forces the operator to use the system 12 (with the dash switch 38 in the on position), in order to maintain battery 26 charge, prevent the engine 14 from getting cold and provide air conditioning and/or heating.

If the system 12 experiences a failure, the relay 74 could possibly be left in its normally open position, in which case the engine 14 could not be started. To avoid this situation, the main unit 60 is equipped with a bypass connector J4 (see FIG. 7) that allows the relay 74 to be connected directly to the ignition switch 30 for starting the engine 14. If this is done, an event log record will be created, so an operator should not perform this bypass, unless it is necessary due to a failure of the system 12.

Fast Idle RPM mode is used to run the engine 14 at a relatively fast idle. It is typically not recommended to operate the engine 14 at base (relatively slow) idle RPM for extended periods, because at base idle RPM the engine does not get hot enough for piston rings to expand enough to provide an adequate sealing effect, the engine coolant fluid does not warm quickly to operate the vehicle's heater, and the alternator output is not sufficient to quickly charge the batteries 26.

The main unit 60 can start and stop fast idle RPM mode in several different ways. The most desirable way is via the vehicle's J1939 CAN bus 48. The main unit 60 can be connected by wire directly to the ECM 46 PTO ports. Another option is to use the vehicle's cruise control switches.

Data records saved, maintained and exported by the main unit 60 (such as, via the data port 58) may be all fixed length hexadecimal records contained in a uniquely named file (for example, consisting of the vehicle number, date and the time of the data export). The records contained in the exported file can include a header record with the most current main unit 60 major revision, the latest minor revision, minutes, hours, date, month, year, main unit serial number and vehicle number, a record with the current status of every configurable item that exists in the password protected configuration menu a cumulative road data record with total data records, a cumulative road data record with trip data records, an event data record with event log records (such as, calibration change records, auxiliary air conditioner event records, auxiliary heater event records, shore power unit event records, etc.

In some examples, the indicator light 78 may be provided. However, in other examples, the indicator light 78 may not be used. If the indicator light 78 is used, it may be installed in close proximity to the dash switch 38 (which also in not necessary in all examples).

If the indicator light 78 is used, the main unit 60 can cause the light to be lit as follows: a) off, if the main unit 60 does not have electrical power and ground, b) solid orange, if someone with password authority confirms the installation and calibration of the system 12, or the system has been bypassed, c) solid red, if the system 12 will not take control again until the operator re-qualifies the system (the system has been active and, because of a problem, the system is now inactive, or the dash switch is in the stop only position), d) solid green, if the system is in control of the engine 14 and is either starting the engine, increasing RPM to fast idle, running the engine, stopping the engine, or in standby, e) flashing green, if, during both the start and the shutdown routines, the 30 second time period the system will permit the operator to take control simply by releasing the park brake or putting the transmission in gear. The flashing green is an indicator to the operator that the opportunity exists to take control without having to first turn off the engine 14.

Figure 4A:
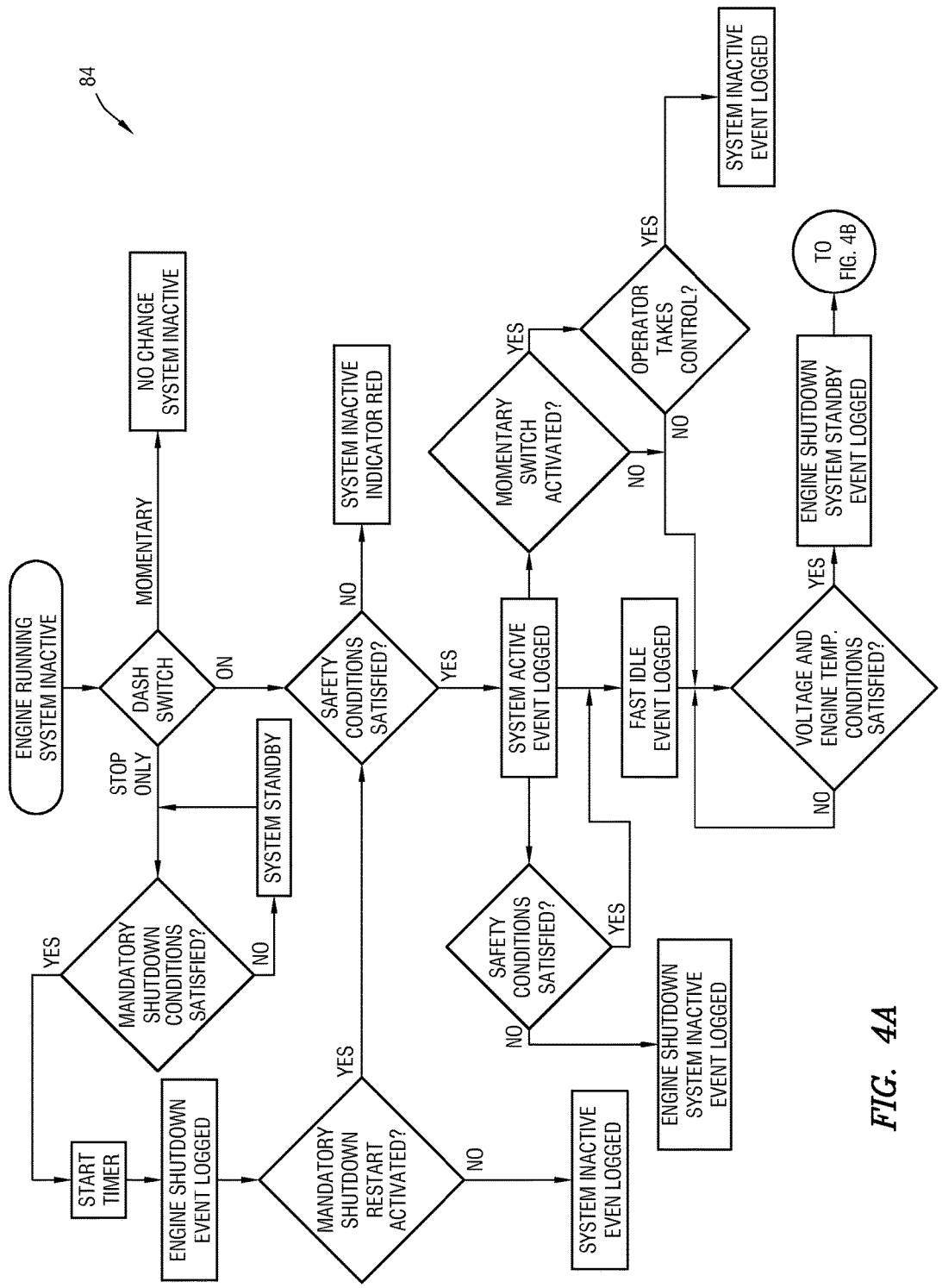
FIGS. 4A & B are a representative flowchart for an example of a method of reducing engine idling, which method can embody the principles of this disclosure.
Figure 4B:
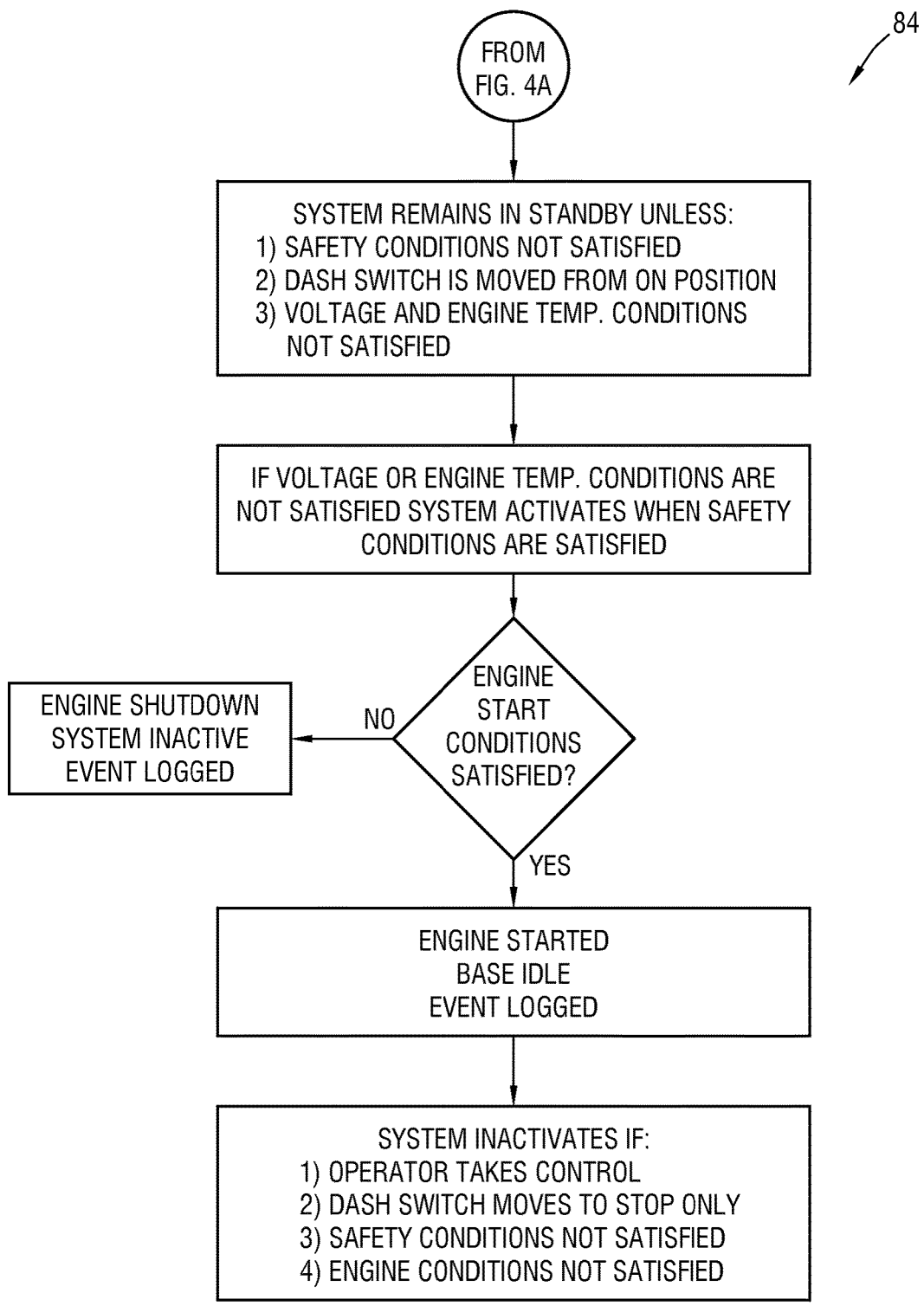

Referring additionally now to FIGS. 4A & B, a flowchart for a method 84 of reducing idling of the engine 14 is representatively illustrated. This flowchart begins with the engine 14 running and the system 12 initially inactive. If the dash switch 38 is in the stop only position, the system 12 can shut down the engine 14 if mandatory shutdown conditions are satisfied. The mandatory shutdown conditions can include, for example, the vehicle 10 being stopped (no speed as indicated by the speedometer 48 signal).

If the mandatory shutdown conditions are satisfied, a timer is started. After a selected period of time, the engine 14 is shut down. If the mandatory shutdown conditions are not satisfied, the system 12 is placed on standby, and the engine is not shut down. As described more fully below, the engine 14 can in some examples be restarted after a mandatory shutdown, in which case the engine will be restarted if the safety conditions are satisfied (for example, the park brake is set, the transmission is in neutral, and the hood is not open).

If the dash switch 38 is in the on position, then the system 12 will start the engine 14 when needed to charge the battery 26 or to warm the engine. As described more fully below, the system 12 can be selected to also run in heat, cool or auto mode, in which case the system can start the engine 14 as needed to heat or cool the vehicle's interior.

If the dash switch 38 is placed in the momentary on position at certain points, the operator can take control (for example, by releasing the park brake or taking the transmission out of neutral), and the system 12 will go to inactive status. If the operator does not take control, then after a selected time period, the system 12 will remain in control.

When the system 12 is active and in control of the engine 14, the engine will be run as long as needed to charge the battery 26 or warm the engine. When the battery 26 is sufficiently charged and the engine 14 is sufficiently warm, the system 12 will shut down the engine and go into standby mode. The system 12 will remain in standby mode unless the safety conditions are not satisfied, the dash switch 38 is moved from the on position, or the battery voltage 26 or engine temperature conditions are not satisfied.

The system 12 will go to inactive mode if the operator takes control, the dash switch 38 is moved to the stop only position, the safety conditions are not satisfied, or the engine conditions are not satisfied. The engine conditions include sufficient oil pressure (during startup and thereafter while the engine is running) and lack of excessive engine temperature.

Figure 5A:
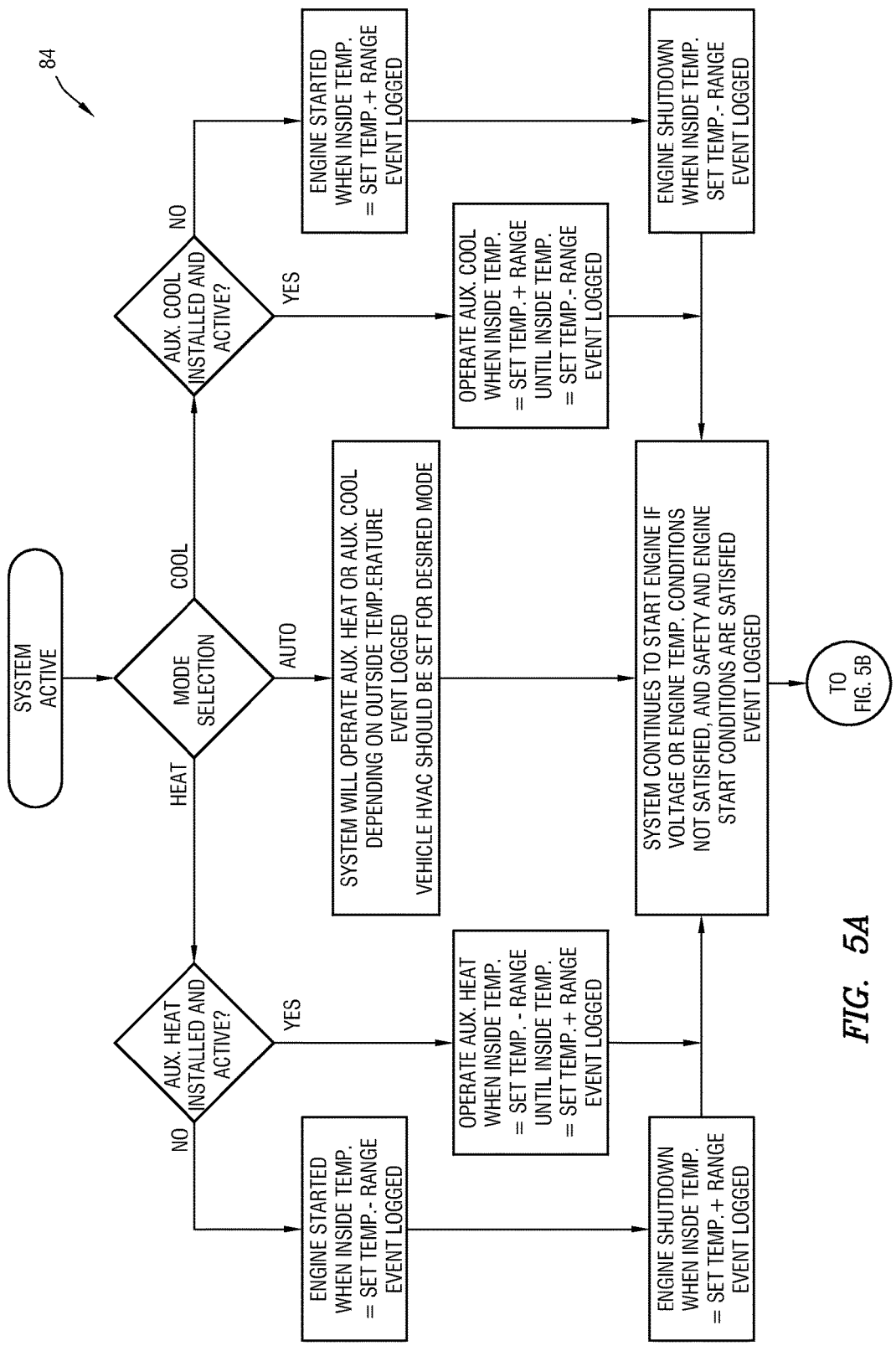
FIGS. 5A & B are a representative flowchart for an example of the method, wherein at least one of heating and cooling of the vehicle is controlled.
Figure 5B:
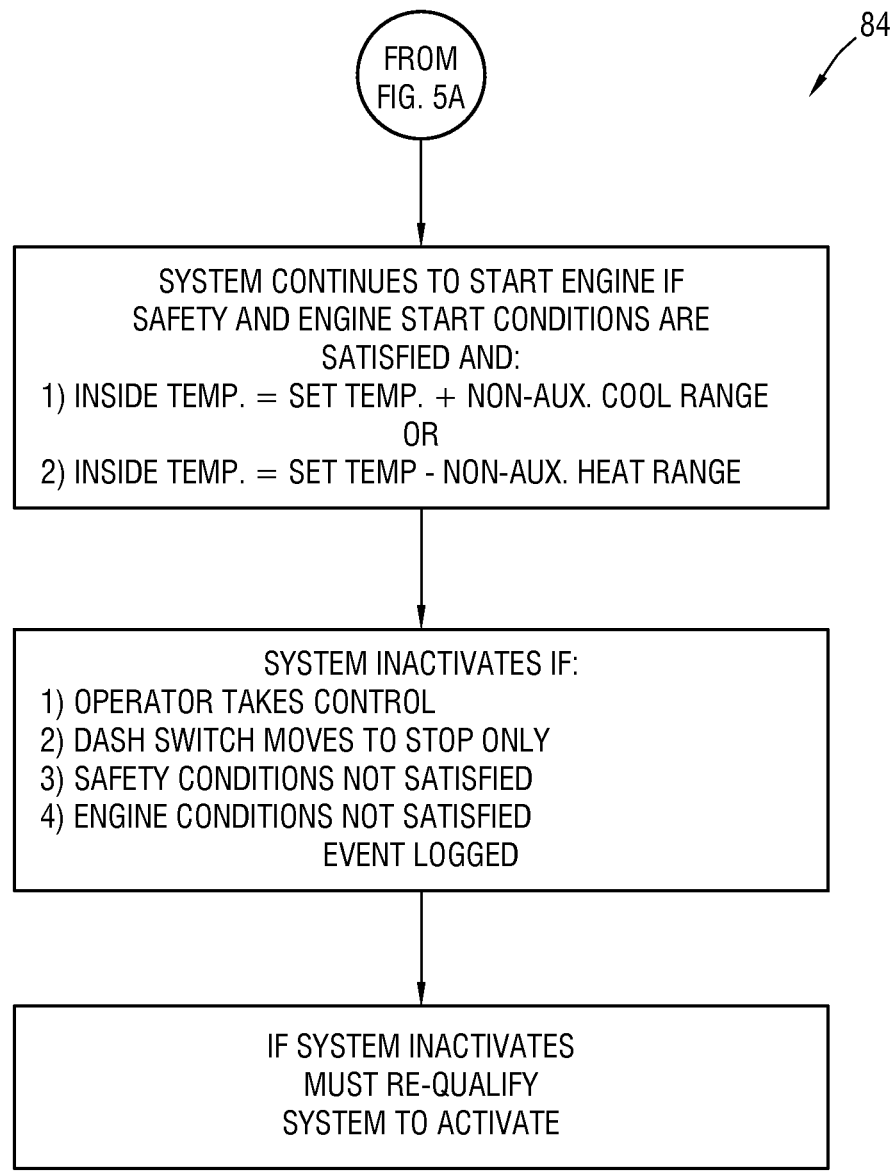

Referring additionally now to FIGS. 5A & B, the method 84 can include selection of heat, cool or auto mode. Note that it is not necessary for the heat, cool or auto mode to be selected, since the system 12 can operate in the engine only mode of FIGS. 4A & B, if desired, without additionally selecting the heat, cool or auto mode.

In cool mode, the system 12 will start and run the engine 14 to supplement the auxiliary air conditioner 16 output (starting the engine allows the vehicle's air conditioner to operate) during initial cool down or in extreme weather. The system 12 will also start and run the engine 14 to charge the batteries 26, or to warm the engine.

The auxiliary air conditioner 16 is used to cool the vehicle's interior using battery 26 power (without needing to run the engine 14). The auxiliary air conditioner 16 will operate when the vehicle inside temperature is equal to the set temperature plus a selected range, and the auxiliary air conditioner will turn off when the vehicle inside temperature is equal to the set temperature minus the range.

Similarly, the auxiliary heater 18 is used to heat the vehicle's interior using diesel fuel and minimal battery 26 power (without needing to run the engine 14). The auxiliary heater 18 will operate when the vehicle inside temperature is equal to the set temperature minus a selected range, and the auxiliary heater will turn off when the vehicle inside temperature is equal to the set temperature plus the range.

In auto mode, the system 12 will use the outside ambient temperature data to determine whether the auxiliary air conditioner 16 or the auxiliary heater 18 should be operated to cool or heat the vehicle's interior. As with the cool and heat modes, the system 12 will start and run the engine 14, if needed, to supplement the air conditioner's or heater's output by operation of the vehicle's HVAC equipment. The selected range for operation of the vehicle's HVAC is preferably greater than the range for operation of the auxiliary air conditioner and heater 16, 18, so that the engine 14 will not be started to cool or heat the vehicle's interior, unless the auxiliary air conditioner or heater is not able to maintain the set temperature (e.g., extreme weather conditions, initial cooling down of a heated vehicle interior, failure of the auxiliary air conditioner or heater 16, 18, etc.).

Figure 6:
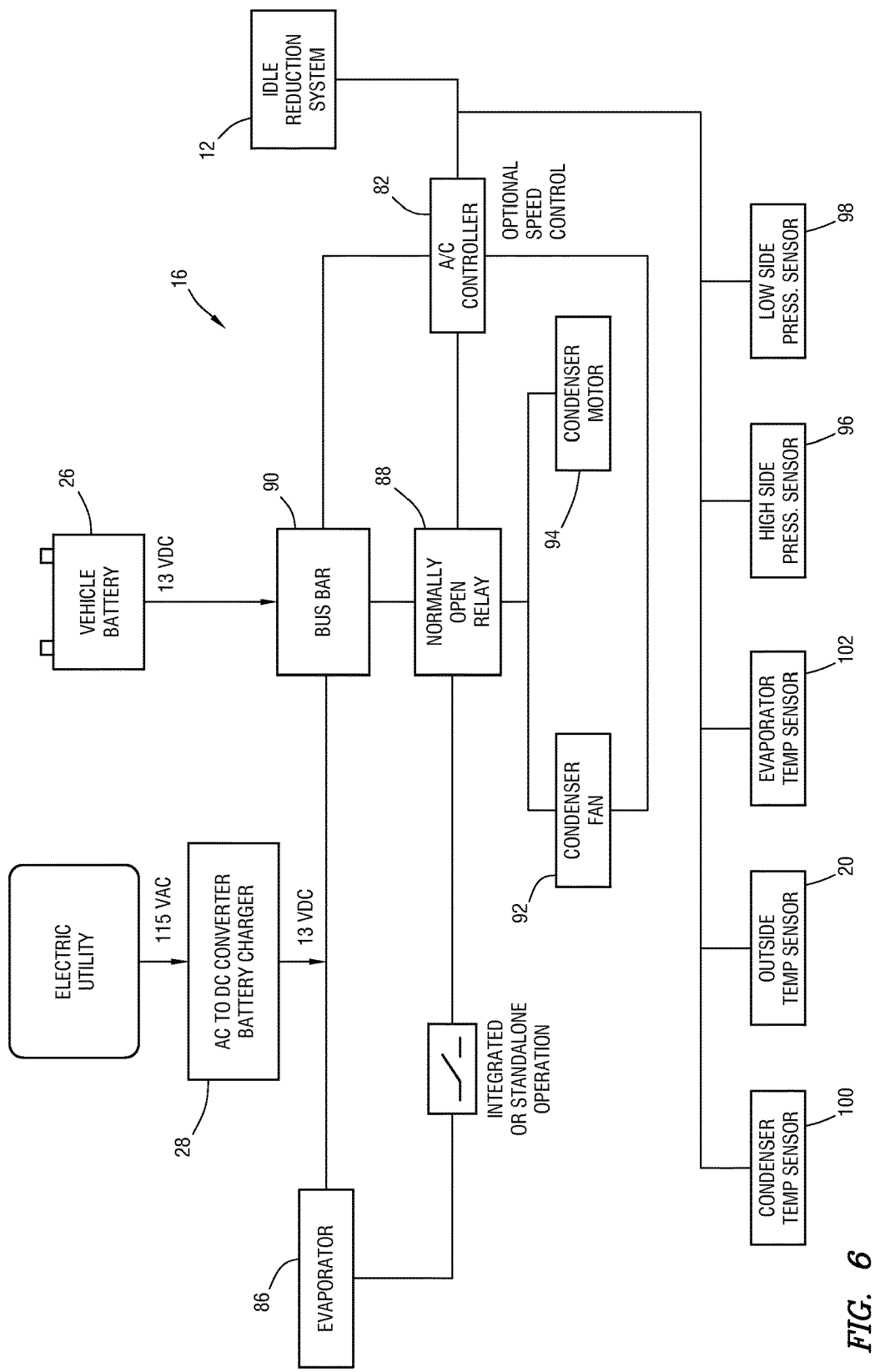
FIG. 6 is a representative block diagram of electrical and sensor components of an example auxiliary air conditioner that can be used with the system.

Referring additionally now to FIG. 6, a block diagram of electrical and sensor components of an example auxiliary air conditioner 16 that can be used with the system 12 is representatively illustrated. The auxiliary air conditioner 16 can be operated as a free-standing, independent, DC powered air conditioner, or as an air conditioner integrated with (controlled and operated by) the system 12.

When the air conditioner 16 is operated as a free-standing air conditioner, the operation of the air conditioner will be controlled by switches, knobs, etc., for example, located on a front of an evaporator 86 in the vehicle's interior. To enable the system 12 to control and operate the air conditioner 16, the cool or auto mode is selected. When cool or auto mode is selected, the system 12 will start, run and shut off the air conditioner 16 via a normally open relay 88 connected between a 12-13 VDC bus bar 90 and the air conditioner's condenser fan 92 and condenser motor 94 as needed to maintain the +/−1 degree temperature range around the cool set temperature.

During the operation, if the evaporator's 86 expansion valve signal is triggered, the main unit 60 will stop the operation of the motor 94 and condenser fan 92 via the relay 88 until the expansion valve again permits operation. This operation will continue until the cool or auto mode is turned off or the system 12 goes inactive.

The auxiliary air conditioner 16 outside unit is equipped with a controller (not shown) to monitor and react to outputs from the pressure sensors 96, 98 installed in the high and low pressure lines and outputs from the temperature sensors 100, 102 located at the output side of the condenser air flow and in front of the cold air output side of the evaporator, and the temperature sensor 20 inside the outside unit for ambient temperature. The controller will shut down operation of the auxiliary air conditioner 16 if any pressures or temperatures are outside of "normal" ranges programmed in the controller's software. The controller will also create and save in its memory event log records documenting all air conditioner events. These event log records can be sent to the main unit 60.

The air conditioner controller 82 depicted in FIG. 6 can comprise a microprocessor circuit with memory and a display. The controller 82 is used to activate the relay 88 in response to a signal from the main unit 60. Optionally, the controller 82 can regulate a speed of the condenser fan 92 and condenser motor 94 to achieve enhanced efficiency and reduced power consumption. If the controller 82 malfunctions, it can be bypassed, so that the auxiliary air conditioner 16 can still operate as a standalone unit (i.e., without being controlled by the main unit 60).

The controller 82 monitors and measures the output from the pressure and temperature sensors 20, 96, 98, 100, 102. If there is a failure or any pressure or temperature is detected as being out of a "Normal or Acceptable" range, the controller 82 will immediately open the relay 88 to shut down the air conditioner 16 operation, and will create and save an event log record for the event. Other event log records are created and saved by the controller 82 when the controller receives the signal from the main unit 60 to turn on the air conditioner 16, and when the air conditioner is successfully turned on. The event log records will include readings from the sensors 20, 96, 98, 100, 102, and will be sent to the main unit 60.

Note that the system 12 can be used alone, or with any combination of the auxiliary air conditioner 16, the auxiliary heater 18 and/or the shore power unit 28. In some applications (such as, buses and other types of transit systems, school buses, non-sleeper trucks of all kinds, construction, mining, quarry, etc.), an "engine only" configuration may be desirable (the system 12 only controls starting and stopping of the engine 14). In the further description below, the term "transit systems" will be used for convenience. In the "engine only" configuration, the system 12 may be used without any of the auxiliary air conditioner 16, the auxiliary heater 18 or the shore power unit 28.

With regard to the dash switch 38, transit system management may not want to have to depend upon their drivers (drivers includes any type of operator) to move the dash switch to the on position while the engine 14 is running when they park and leave their buses. This may be true for non-transit system applications as well.

In that case, the system 12 can be configured to operate in engine only mode without first being turned on when the engine 14 is running in order to take control of the engine. However, the system 12 should not start and run the engine 14 in an inappropriate location or situation.

If the dash switch requirement is disabled (for example, via a menu choice on the I/O device 50), an optional two position switch and wire harness can be installed somewhere in or on the vehicle, the use of which will enable a technician to disable the system's 12 ability to start and run the vehicle engine 14. Of course, a technician can also bypass the system 12 as described above.

With the dash switch not installed and disabled, without human input, the system 12 will always be ready to operate whenever the ignition switch 30 is in the off position, all of the safety conditions are satisfied, and battery 26 voltage drops to the selected voltage engine start level or the engine 14 temperature drops to the selected engine temperature start level.

The operator can take control of the engine 14, in situations where the dash switch 38 is not installed, if the ignition switch 30 is moved from the off position to the on position, and the safety conditions remain satisfied. The system 12 will then immediately reduce engine RPM to base idle RPM. When this happens, there will be a configurable period of time (e.g., 30 to 60 seconds) during which the operator can take control of the engine 14 by releasing the park brake or putting the transmission in gear, and doing so will not be treated as a safety violation by the system 12 (which would otherwise require an immediate engine shutdown). If the operator does not do either one of these two things within the time period allowed after turning the ignition switch 30 to the on position, the system 12 will then shut down the engine 14 and go inactive. If this should happen, the operator can start the engine, and continue as if the system 12 was not in control (the system will be inactive).

Transit systems may not desire the mandatory shutdown feature, because it is not uncommon for buses to have to idle for extended periods of time. In that case, a modified version of the mandatory shutdown feature can be provided. In this modified version, the ignition switch 30 can be left in the on position for use of running lights, etc., and the system 12 can be configured to shut down the engine 14 to preserve battery 26 voltage and/or eliminate unnecessary idling.

A standard time period for mandatory shutdown could be 3 to 25 minutes. If a transit system desires to use the modified version of the mandatory shutdown feature, several changes can be made that might make this feature more desirable: The configurable time limit can be expanded to a higher limit (such as one or more hours). Mandatory Shutdown can be disabled or have its own separate time limit at which it in effect turns off the ignition switch 30 and shuts down the engine 14. If the ignition switch 30 is in the on position and the engine 14 is not running, the mandatory shutdown feature can be disabled or have its own separate time limit at which it in effect turns off the ignition switch. A mandatory shutdown restart feature can be provided which, if activated and a mandatory shutdown has occurred, and if all safety conditions are satisfied, the system 12 will start and run the engine 14 for battery 26 voltage and engine temperature requirements as it normally would do when the vehicle ignition switch is left in the off position.

Installation of the indicator light 78 in the vehicle dash is not required, but if this is not done, the valuable information visible to someone in the event of a malfunction of the system 12 will be lost. If the indicator light 78 is not installed in the vehicle dash, then preferably it is installed somewhere on the vehicle 10 so it can be observed by someone, without violating a safety condition of the system 12.

For transit systems, it may be desirable to have the interior temperature of the vehicle somewhere around 18 degrees C. when the driver arrives, for example, to provide a level of comfort for the driver and to make sure the interior of the bus is warm when passengers are first picked up. In such situations, the system 12 can provide a configurable interior temperature at a configurable time of day for each day of the week, as follows: The vehicle's HVAC controls can be left in the on position and the blower fan's control in the highest position. In order to enable, disable or change any parameter of the timed start feature, an I/O device 50 is connected to the main unit 60. In a password protected configuration menu, a user will find a menu item for timed engine starts. Under this menu item, a display will be available for each of the seven days in a week. Air conditioning timed starts may or may not be required, but provision for air conditioning can be included in the configuration display. In the display, the following fields can be included: day of week, on or off (with on selected to enable the system 12 to perform this timed start feature), time of day (the time that the system 12 will start and run the vehicle's engine 14, if necessary, to achieve the desired interior temperature, select air conditioning (if this field is turned on, the system 12 will start and run the engine 14 to cool the interior to within a selected range of a set temperature field), air conditioning set temperature, air conditioning temperature range, select heater (if this field is turned on, the system 12 will start and run the engine 14 to heat the interior to within a selected range of a set temperature field), heater set temperature, heater temperature range, maximum number of start-run-stop cycles. This last field enables the user to establish how many of these timed heat or air conditioning start-run-stop cycles the system 12 will perform before abandoning this action. Due to holidays or other reasons there may be times when starting and running to achieve a desired interior temperature may not be required. Limiting the number of heat or air conditioning timed starts will prevent the system 12 from continually maintaining inside temperature in these situations.

If both air conditioning and heater are selected, the system 12 will automatically know which set temperature and range to use based upon the outside ambient temperature. If the outside ambient temperature is at or above the air conditioning set temperature plus its range, the system 12 will use the air conditioning set temperature and range. Conversely, if the outside temperature is below the heater set temperature minus its range, the system 12 will use the heater set temperature and range. The vehicle's HVAC controls should be left with the correct (heat or air conditioning) setting by the operator.

The system 12, configured as described above, has several advantages. There is no need to rely on a driver to remember to turn the system 12 on when leaving the vehicle 10. By employing this ability/feature to have the system 12 "take control" when the vehicle ignition switch 30 is in the off position, this problem of the driver forgetting is avoided, and doing so also eliminates the time and cost of installing the corresponding wiring harness and switch. In this configuration, dropping from fast idle RPM when the ignition switch 30 is turned on is a convenient way to provide for gentle shutdown, or for the operator to take control of a presently system-controlled running engine.

If the mandatory shutdown feature is activated, and a mandatory shutdown has occurred, upon the condition all safety conditions are met, the system 12 will start and run the engine 14 to satisfy battery 26 voltage and engine temperature requirements as it normally would do when the vehicle ignition switch 30 is left in the off position.

Many commercial vehicles in addition to transit buses will have a set day schedule that makes the timed daily start and set interior temperature features desirable. Because the system 12 is both a start and a stop system, the engine 14 will only be running as long as necessary to achieve the set temperature, and then may be programmed to do this task just a set number of times. Thus, on holidays, snow days, etc., running the engine 14 on those scheduled days and times will not be excessive.

Figure 7:
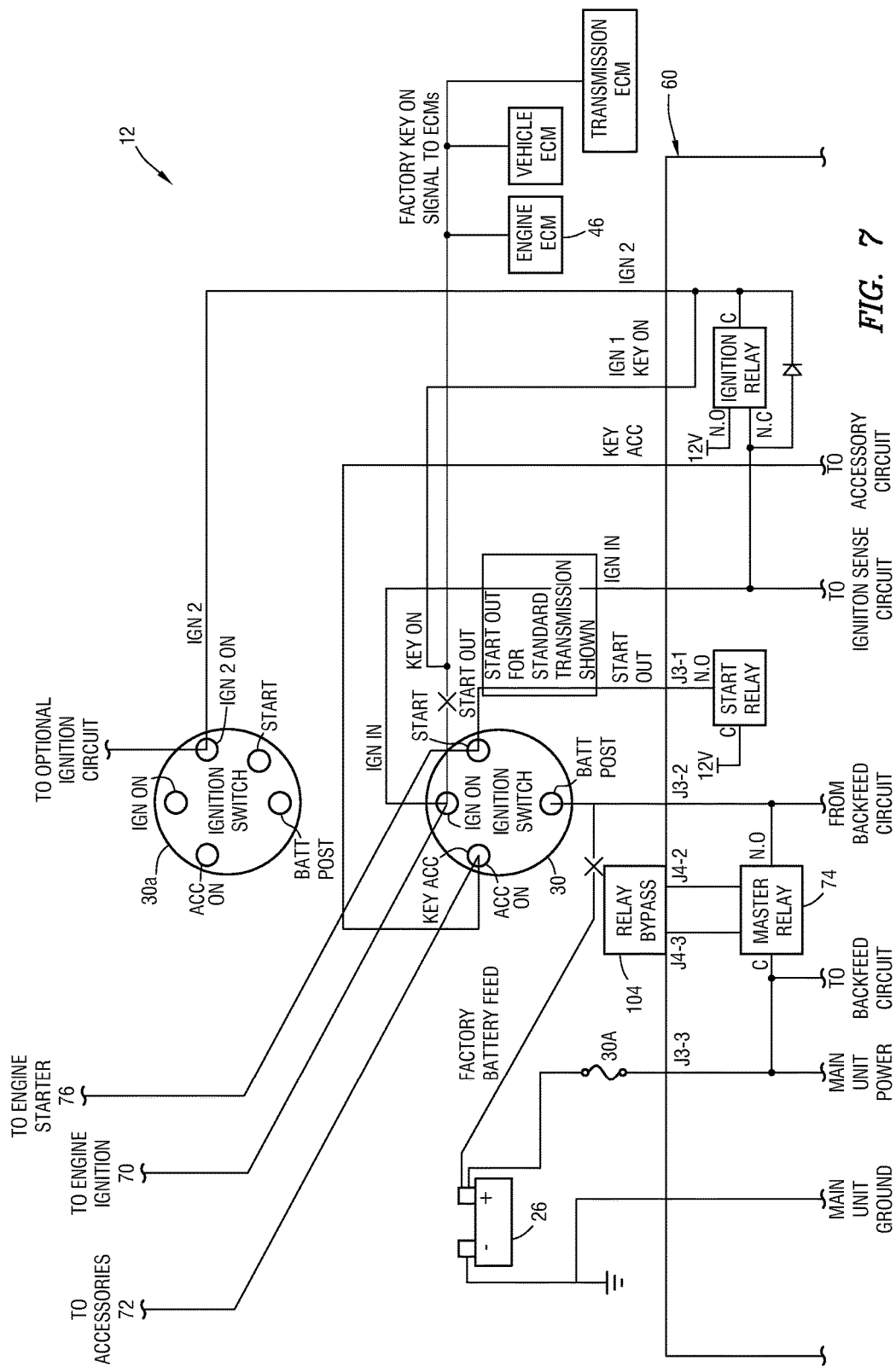
FIG. 7 is a representative block diagram of the idle reduction system interface with an engine ignition switch.

Referring additionally now to FIG. 7, a block diagram for an interface of the main unit 60 with the engine ignition switch 30 is representatively illustrated. This block diagram also depicts how the relay 74 (which controls supply of battery voltage to the ignition switch 30) can be bypassed, for troubleshooting purposes (e.g., to allow engine functions to be tested without the idle reduction system 12 controlling engine start and stop), or in case the relay 74 fails open (thereby preventing electrical power from being supplied to the ignition switch).

In normal operation three signals from the ignition switch are connected to a J3 connector of the main unit 60. Pin 1 of J3 (J3-1) is the start output of the main unit 60 and connects to the start post of the ignition switch 30. The main unit 60 uses this signal to initiate an engine start. This signal is in parallel to the engine's starter system connection.

Pin 2 of J3 (J3-2) is the ignition switch 30 battery feed post. As required, the main unit 60 applies and removes power via the master relay 74 to the ignition switch 30 battery feed post to control the engine's operation. In retrofit installations, this main unit 60 output connection to the ignition switch 30 battery feed post replaces the vehicle's battery feed to this post (indicated by an "X" in FIG. 7 on the factory battery feed).

Pin 3 of J3 (J3-3) is the battery 26 positive voltage feed to the master relay 74. When the relay 74 is closed, positive battery voltage is output via the master relay to pin 2 of J3 (J3-2, to the ignition switch 30 battery post), thereby allowing accessories 72 and engine ignition 70 to receive positive battery voltage.

Since the ignition switch 30 wiring is modified (in retrofit installations) to allow the main unit 60 to control the engine 14, should a system 12 failure occur, the engine would be rendered in-operable. In order to provide a simple means of restoring engine 14 operation, main unit connector J4 is configured to provide a "bypass" of the system 12. Internal to the main unit 60, J4 is configured to "restore" the original wiring configuration of the ignition switch 30 without the physical act of removing and replacing the modified wires.

J4 provides the means to bypass the master relay 74 by internally directly connecting the ignition switch 30 battery feed post (J3-2) to the battery feed (J3-3). When the ignition switch 30 connector is removed from J3 and is connected to J4, the original wiring configuration is restored (i.e., the ignition switch 30 battery post is electrically connected to the battery 26 positive terminal) and normal engine 14 operation is restored.

Another ignition switch configuration 30*a* is also depicted in FIG. 7. The battery post, accessories on, ignition (1) on and start posts of this ignition switch configuration 30*a* are the same as those of the ignition switch 30, and so are not duplicated in FIG. 7. The ignition switch configuration 30*a* has an additional optional ignition circuit connected to an ignition (2) post. In the main unit 60, this "IGN2" post is connected to the same ignition relay as the ignition (1) post, which also supplies a signal to the engine ECM 46 and any other ECM's (with a factory wire for this purpose being disconnected, as indicated by an "X" in FIG. 7), so that error codes are not generated by the ECM's when the main unit 60 supplies power to the engine ignition 70.

It may now be fully appreciated that the above disclosure provides significant advances to the art of reducing engine idling time. In some examples of the idle reduction system 12 described above, the engine 14 can be shut down to prevent excessive idling, and operation of the system can be integrated with an auxiliary air conditioner 16 and an auxiliary heater 18.

More specifically, the above disclosure provides to the art an idle reduction system 12 for use with an engine 14, with the system comprising: a main unit 60 including a controller 66 and a relay 74 controlled by the controller. The relay 74 is electrically connected between an ignition switch 30 and an electrical power source (such as the battery 26) for starting the engine 14.

The system 12 can also include a battery-powered air conditioner 16. The system 12 can start the engine 14 and thereby charge a battery 26 while the air conditioner 16 is being operated. The battery 26 may also supply electrical power to the air conditioner 16. The system 12 can start the engine 14 and thereby operate a vehicle HVAC while the air conditioner 16 is being operated.

The system 12 can include a diesel-fueled heater 18. The system 12 can start the engine 14 and thereby charge a battery 26 while the heater 18 is being operated.

The system 12 can generate and store event log records in the main unit 60.

The system 12 starts the engine 14 in response to at least one of: a) battery voltage being less than a predetermined level, b) engine temperature being less than a predetermined level, c) vehicle interior temperature being less than a predetermined level, and d) vehicle interior temperature being greater than a predetermined level.

The system 12 may start the engine 14 with the ignition switch 30 in an off position.

The system 12 may stop the engine 14 in response to a predetermined period of engine idling, and ten start the engine in response to at least one of: a) battery voltage being less than a predetermined level, b) engine temperature being less than a predetermined level, c) vehicle interior temperature being less than a predetermined level, and d) vehicle interior temperature being greater than a predetermined level.

The system 12 may start the engine 14 at selected times on selected days. The system 12 may start the engine 14 at the selected times on the selected days only in response to at least one of the group consisting of: a) battery voltage being less than a predetermined level, b) engine temperature being less than a predetermined level, c) vehicle interior temperature being less than a predetermined level, and d) vehicle interior temperature being greater than a predetermined level. The system 12 may start the engine 14 only a predetermined number of times during the selected times on the selected days.

A method of reducing idling of an engine 14 is also provided to the art by the above disclosure. In one example, the method can comprise: connecting an idle reduction system 12, thereby permitting the system to shut down the engine 14 in response to one or more predetermined conditions; the idle reduction system starting the engine in response to at least one of: a) battery voltage being less than a predetermined level, and b) engine temperature being less than a predetermined level; and the idle reduction system controlling operation of at least one of: a battery-powered air conditioner 16 and a diesel-fueled heater 18.

The system 12 may further start the engine 14 in response to at least one of the group consisting of: c) vehicle interior temperature being less than a predetermined level, and d) vehicle interior temperature being greater than a predetermined level.

The system 12 can include the three position dash switch 38 with the momentary position. The operator can toggle the switch 38 to the momentary position, which will cause the system 12 to drop engine RPM from fast idle RPM to base idle RPM, and then it will flash the indicator light 78 green for a 30 second time period (configurable). While the indicator light 78 is flashing green, the operator can take control of the engine 14 and either drive the vehicle 10 or shut off the engine without a hard shutdown.

The input/output device 50 can have backlighting for its cursor control 54 and/or entry keys 56. The backlighting can be manipulated by the main unit 60 software to provide different colors that can also be either solid or flashing. This provides a visual indication to the operator of the status or mode in which the system 12 is operating.

In the system 12, control of the auxiliary air conditioner 16 and the auxiliary heater 18 can be integrated with control of the engine 14 start and stop. The system 12 is designed to greatly reduce engine 14 idle time by its ability to start, run and stop an auxiliary diesel fired air heater 18 for temperature controlled interior heat, and to start, run and stop a battery powered air conditioner 16 or thermal storage device to provide temperature controlled air conditioning for the operator. This capability not only reduces engine idle time, it also greatly reduces engine starts and stops.

The system 12 is also capable of operating with or without auxiliary heating and air conditioning devices. A menu system navigated via the input/output device 50 provides a means of activating or deactivating the main unit's 60 control over auxiliary air conditioning and/or heating devices.

Incorporation of the system 12 with the auxiliary heater 18 and air conditioner 16 avoids problems with standalone auxiliary heaters and air conditioners. If, because of harsh weather conditions or auxiliary device failure, an auxiliary device is installed and is not capable of maintaining its set temperature range, and the vehicle 10 interior temperature rises or lowers to the selected Heat/Air engine start temperature, the system 12 will automatically start the engine 14 and the vehicle's HVAC will thereby supplement the auxiliary device heating or cooling output.

Running the vehicle's HVAC will quickly help bring the vehicle 10 interior temperature within the heat or cool set temperature range. This capbility is important because it will typically take some time for an auxiliary heater 18 to warm a cold soaked interior and for an auxiliary air conditioner 16 to cool a heat soaked interior. More importantly for the auxiliary air conditioner 16 is that it has to use limited battery storage capacity to cool down a heat soaked interior. The ability of the system 12 to start and run the vehicle's engine 14 and operate the vehicle's HVAC to help quickly bring the temperature down to the desired level also means the vehicle's alternator will be running and replenishing the battery power as it is being used by the auxiliary air conditioner 16.

In heat or cool mode, whether auxiliary devices are installed or not, the system 12 will still start and stop the engine 14 to charge the batteries 26 and to heat the engine as needed. With the system 12, full functionality of the auxiliary heater 18 and air conditioner 16 is realized, while at the same time the operator does not have to worry about depleting battery 26 power or a cold engine 14.

With regard to the integration of the system 12 with the auxiliary air conditioner 16 and heater 18, if the system is operated in heat or cool mode (selectable via a configuration menu), the system will operate the appropriate auxiliary device (instead of the engine 14 and vehicle HVAC) to maintain desired vehicle interior temperature. If the interior temperature deviates sufficiently from the desired temperature, even with the auxiliary device running, the system 12 will start the engine 14 to operate the vehicle's 10 HVAC to supplement the auxiliary device's output. This integration also enables the "auto" mode for operation of either the auxiliary heater 18 or the auxiliary air conditioner 16 as appropriate, depending on the measured outside temperature.

With just one desired interior temperature setting via the input/output device 50, the system 12 can start, run and stop the engine 14 and enable operation of the vehicle 10 HVAC as needed to maintain the interior temperature within a selected range of the desired temperature, while it also controls operation of the battery powered auxiliary air conditioner 16, creates event log records when it starts and stops the auxiliary air conditioner, and also retrieves event log records created and saved by the auxiliary air conditioner controller 82. These same features are provided also for the auxiliary heater 18. The combination (system 12 control of the auxiliary air conditioner 16, auxiliary heater 18 and engine 14) also enables provision of the "auto" mode.

The system 12 is capable of displaying error status for real time and past event troubleshooting. The system's 12 Error Status display shows both current error causes and past error status causes for any event log recorded by the system.

The system 12 can include real time display of inputs and outputs. A Diagnostics display provided by the system 12 shows the real time status of all inputs and outputs employed by the system. This capability is beneficial for thoroughly checking out a newly installed system 12, and for trouble shooting an existing problem.

The system 12 can display trip data and accumulated data. This feature quickly provides the data helpful to evaluate performance and savings realized from use of the system 12. The system 12 accumulates data, such as, driving hours, traffic idle hours, parked idle hours, parked engine stopped hours, engine starts for battery voltage hours, engine starts for engine temperature hours, engine starts for vehicle HVAC air conditioning or heating hours, auxiliary heater 18 and air conditioner 16 hours, number of starts for engine temperature, number of starts for battery voltage, number of starts for vehicle heat, number of starts for vehicle HVAC heating and air conditioning, number of starts for auxiliary heater 18 and auxiliary air conditioner 16, etc. Trip data is accumulated from the last time the trip data was reset. Reset can be performed from a non-password protected menu. Both trip data and total data can be extracted for use in a spreadsheet, database, etc. Total data can include the same fields and data as the trip data, but total data is rarely reset. Password authority may be needed to access a configuration menu to clear or reset total data.

Data can be saved for every main unit 60 action in an event log record. The system 12 creates and saves an event log record for each and every action performed by the system. In addition to an event identification code and event description, the event log records contain many other data fields to record conditions as they existed when the event log record was created and saved. These event log records can be extracted for use in a spreadsheet, database, etc. For example, if the vehicle 10 is equipped with a two way communication system, management, skilled technicians, etc., can extract the event log records in real time for review and analysis. The main unit 60 memory 64 may be capable of storing thousands of individual event log records, so they are not only valuable for troubleshooting (particularly for intermittent problems), they also provide a wealth of operating data. Admin logs are event log records that carry an identifying field that also marks them as being of administrative interest.

In some examples, the system 12 can export data, including the event log records. The export may be via the data port 58 or via a two way communication network.

The system 12 can include temperature sensor 20, 42 calibration. If the system 12 installation does not use J1939 CAN bus 48 data for outside and inside temperature, this feature enables calibration of independent inside and outside temperature sensors 20, 42.

The system 12 can have certain beneficial inputs. A switch can be provided (e.g., by a vehicle manufacturer), and the switch can operate as an additional safety condition. A selected switch input (such as, opening of a normally closed switch, etc.) will cause the system 12 to shut down the engine 14.

The system 12 can, in some examples, prevent a mandatory shutdown of the engine 14 when the PTO is engaged. PTO engagement can be indicated by any of a variety of means, such as the PTO switch 40 or the J1939 CAN bus 48.

The system 12 can, in some examples, be provided with a switch to indicate to the system that mandatory shutdown should be delayed and allow the vehicle's air compressor to run long enough to charge the vehicle's air brakes.

The system 12 can provide for high temperature exhaust regeneration. Two options for high temperature exhaust regeneration may be provided: 1) the system 12 remains inactive, or 2) the system takes control of the engine 14 again after regeneration occurs.

The system 12 can be configured as desired to control shutdown of the engine 14. Shutdown conditions and parameters are configurable by password-protected menus. A Delayed Stop configurable field applies when the system 12 is in control and the engine 14 is running. Delayed Stop is the amount of time the system 12 will let the engine 14 run after all conditions have been met (engine temperature, battery 26 voltage, and interior temperature if the system is in heat or cool mode). The range of choices is from 15 sec to 25 min. Factory default is 30 sec.

A Base Idle Time configurable field applies when the system 12 is in control and has just started the engine 14. Base Idle Time is the amount of time which the main unit 60 will wait after the engine 14 is started before the main unit activates fast idle.

An Acc Off V configurable field sets a level to which battery 26 voltage can drop before the system 12 will turn off the accessories 72. This level should be no less than the voltage that triggers the system 12 to start the engine 14 because of low battery 26 voltage.

The main unit 60 can use the J1939 CAN bus 48 to activate fast idle. This enhances reliability, reduces installation time and eliminate a wire harness that would otherwise be required to activate fast idle (e.g., via the engine ECM 46). A menu selection can provide for a fast idle RPM test (the system 12 causes engine RPM to increase to fast idle RPM). This is beneficial to test the ability of the system 12 to bring engine RPM to desired fast idle RPM.

The system 12 can include features related to its interface with the ignition switch 30. If the ignition switch 30 is in the on position, the main unit 60 will start and stop the engine 14 for HVAC operation as needed, but it can also continue to run the HVAC's blowers when the engine is not running. The system 12 does this by back-feeding positive battery voltage to the ignition on and accessories posts of the ignition switch 30.

When the ignition switch 30 is in the off position, the main unit 60 can default to engine mode only. The main unit 60 can also operate in heat or cool mode with the ignition switch 30 in the off position.

The main unit 60 can operate in engine mode and/or heat and cool mode when the ignition switch 30 is on the accessories position. This capability provides the benefit of enabling the accessories 72 to remain on when the main unit 60 is not running the engine 14. This is a benefit for an operator that uses accessories 72, such as the vehicle's radio, a refrigerator, a microwave, a television or a computer, etc.

The system 12 can include wire harnesses configured to mitigate problems due to exposure of connections to environmental conditions (e.g., vibration, rain, salt, heat/cold cycles, etc.). Separate wire harnesses for all connections are packaged individually with all sensors, parts, wires or cables and instructions needed for each individual wire harness. The connections at all sensors are made with factory installed weather resistant connectors that eliminate any need for butt connectors, soldering and shrink tube work at the sensors and connectors. All connectors at the main unit 60 are pluggable terminal block connectors with set screws. A technician cuts the various harness wires to length, strips insulation from the wire ends, slides the bare wire into the correct, numbered connector and tightens the set screw.

The system 12 can include a provision for bypassing the system. By removing a connector from its standard, operating connector J3 and inserting it into another connector J4, the system 12 is rendered inoperable, except for record keeping, so that the engine 14 can be operated as if the system were not installed.

The indicator light 78 can provide a visible status indication. In one example, the indicator light 78 can be lit with an orange color to indicate that the main unit 60 is not configured or the system 12 bypassed. The indicator light 78 can flash green when the system 12 is starting or shutting down the engine 14. While the indicator light 78 is flashing green, the operator can take control of the engine 14 without having it shutdown.

In some examples (such as transit installations), no dash switch 38 or indicator light 78 may be provided. Regardless of the ignition switch 30 position in such examples, the system 12 will start and run the engine 14 as needed to maintain battery 26 voltage and/or engine temperature. This feature may be activated via a configuration menu.

The system 12 can include a mandatory shutdown restart feature. If the engine 14 is stopped due to a mandatory shutdown (caused, for example, by excessive engine idling), the system 12 can still start and run the engine if battery 26 voltage or engine temperature drops to their configurable set points.

The system 12 can be configured to start the engine 14 as needed to maintain desired vehicle interior temperature on selected days and times of the selected days. Timed engine 14 starts on the selected days of the week and the desired interior temperature can be input via a configuration menu.

If the operator leaves accessories 72 on, the system 12 can turn off electrical power to the accessories when battery 26 voltage drops to a level that is greater than the battery voltage level that causes the system to start the engine.

The system 12 can include the battery powered auxiliary air conditioner 16 that is controlled by the system. The auxiliary air conditioner 16 can include built in pressure sensors 96, 98 and temperature sensors 20, 100, 102. The air conditioner controller 82 creates and saves an event log record for every action and transfers such records to the main unit 60.

The system 12 can include the auxiliary heater 18 that is controlled by the system. The heater 18 can include a controller that monitors the heater's operation and internally generated problem codes, creates and saves event log records for each action, and transfers such records to the main unit 60. The auxiliary heater 18 can be installed in a manner that greatly reduces installation time and effort for service, removal and replacement.

The system 12 can include the shore power unit 28. The shore power unit 28 can include a microprocessor controlled monitor. The shore power unit's 28 operation and problems are monitored, event log records are created and saved for each action, and such records are transferred to the main unit 60.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations and in various configurations, without departing from the principles of this disclosure. The embodiments are described merely as examples of useful applications of the principles of the disclosure, which is not limited to any specific details of these embodiments.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

A connection of elements does not require that the elements are directly connected to each other. Instead, the elements can be structurally or functionally connected, even if additional elements are interposed between the connected elements.

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. An idle reduction system for use with a vehicle including an interior, an engine and an HVAC, the system comprising:
    a device via which a selected vehicle interior temperature range is input;
    an auxiliary air conditioner;
    an auxiliary heater;
    a controller that operates one of the auxiliary air conditioner and the auxiliary heater and thereby maintains the vehicle interior temperature in the selected temperature range; and
    a main unit separate from a dash of the vehicle, the main unit including the controller and a relay controlled by the controller, the relay being electrically connected between an ignition switch and a battery for starting the engine, wherein the relay is positioned inside the main unit, and wherein the controller causes the engine to start and thereby causes the vehicle HVAC to operate when the one of the auxiliary air conditioner and the auxiliary heater does not maintain the vehicle interior temperature in the selected temperature range.

2. The system of claim 1, wherein the auxiliary air conditioner includes an electric condenser motor electrically powered by a battery that also electrically powers a starter of the vehicle.

3. The system of claim 1, wherein the auxiliary air conditioner transfers event log records to a main unit of the system.

4. The system of claim 1, wherein the auxiliary heater burns diesel fuel.

5. The system of claim 1, wherein the auxiliary heater transfers event log records to a main unit of the system.

6. The system of claim 1, wherein the main unit includes a bypass connector, and wherein connection of the ignition switch to the bypass connector bypasses the relay and continuously supplies electrical power from the battery to the ignition switch.

7. The system of claim 1, wherein the controller operates the auxiliary air conditioner in response to an outside temperature being greater than the vehicle interior temperature range, and wherein the controller operates the auxiliary heater in response to the outside temperature being less than the vehicle interior temperature range.

8. An idle reduction system for use with a vehicle including a battery, an engine and an ignition switch, the system comprising:

a main unit having housed therein a controller and a relay controlled by the controller, the relay being electrically connected between the ignition switch and the battery, and the main unit including a bypass connector, wherein connection of the ignition switch to the bypass connector bypasses the relay and continuously supplies electrical power from the battery to the ignition switch.

9. The system of claim 8, wherein regardless of a position of the ignition switch, the controller starts the engine and thereby maintains a voltage level of the battery and a temperature level of the engine.

10. The system of claim 8, further comprising a device via which a selected vehicle interior temperature range is input, an auxiliary air conditioner, and an auxiliary heater, wherein the controller operates one of the auxiliary air conditioner and the auxiliary heater and thereby maintains the vehicle interior temperature in the selected temperature range.

11. The system of claim 10, wherein the controller causes the engine to start and thereby causes an HVAC of the vehicle to operate when the one of the auxiliary air conditioner and the auxiliary heater does not maintain the vehicle interior temperature in the selected temperature range.

12. The system of claim 11, wherein the controller operates the auxiliary air conditioner in response to an outside temperature being greater than the selected temperature range, and wherein the controller operates the auxiliary heater in response to the outside temperature being less than the selected temperature range.

13. An idle reduction system for use with a vehicle including a battery, an interior and an ignition switch, the system comprising:

a controller and a relay controlled by the controller, the relay being electrically connected between the ignition switch and the battery; and a main unit that houses the controller and the relay controlled by the controller, and the main unit including a bypass connector, wherein connection of the ignition switch to the bypass connector bypasses the relay and continuously supplies electrical power from the battery to the ignition switch, and wherein regardless of a position of the ignition switch, the controller starts the engine as needed to maintain a voltage level of the battery and a temperature level of the engine.

14. The system of claim 13, wherein the controller starts the engine within selected times on selected days.

15. The system of claim 14, wherein the controller starts the engine within the selected times on the selected days in response to at least one of the group consisting of: a) a temperature of the vehicle interior being less than a predetermined temperature range, and b) the vehicle interior temperature being greater than the predetermined temperature range.

16. The system of claim 14, wherein the system starts the engine only a predetermined number of times during the selected times on the selected days.

17. The system of claim 13, wherein with the ignition switch in an off position, the controller starts the engine as needed to maintain the voltage level of the battery and the temperature level of the engine.

18. The system of claim 13, wherein the main unit includes a memory that stores event log records generated by the main unit.

* * * * *